(12) United States Patent
Fujita

(10) Patent No.: US 9,231,739 B2
(45) Date of Patent: Jan. 5, 2016

(54) WIRELESS STATION, COMMUNICATION SYSTEM, AND COMMUNICATION METHOD

(75) Inventor: Hiroshi Fujita, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 129 days.

(21) Appl. No.: 13/613,903

(22) Filed: Sep. 13, 2012

(65) Prior Publication Data

US 2013/0100937 A1   Apr. 25, 2013

(30) Foreign Application Priority Data

Oct. 25, 2011 (JP) ................................ 2011-234113

(51) Int. Cl.
| H04L 1/18 | (2006.01) |
| H04L 1/00 | (2006.01) |
| H04W 28/18 | (2009.01) |
| H04W 72/12 | (2009.01) |
| H04W 88/02 | (2009.01) |

(52) U.S. Cl.
CPC .............. *H04L 1/1854* (2013.01); *H04L 1/188* (2013.01); *H04L 1/1848* (2013.01); *H04L 1/1887* (2013.01); *H04L 2001/0092* (2013.01); *H04W 28/18* (2013.01); *H04W 72/12* (2013.01); *H04W 88/02* (2013.01)

(58) Field of Classification Search
None
See application file for complete search history.

(56) References Cited

U.S. PATENT DOCUMENTS

| 7,626,966 B1* | 12/2009 | Ruiter et al. ................... 370/337 |
| 7,881,340 B2* | 2/2011 | Farrag et al. ................... 370/468 |
| 2003/0043744 A1 | 3/2003 | Lu et al. |
| 2004/0105401 A1* | 6/2004 | Lee ................................ 370/311 |
| 2004/0165532 A1 | 8/2004 | Poor et al. |
| 2004/0165543 A1* | 8/2004 | Nakazawa ..................... 370/252 |
| 2005/0128977 A1* | 6/2005 | Kwak et al. .................... 370/329 |
| 2006/0171353 A1* | 8/2006 | Nagata et al. .................. 370/329 |
| 2007/0019592 A1* | 1/2007 | Otsuki ........................... 370/338 |
| 2007/0217352 A1* | 9/2007 | Kwon ............................ 370/312 |
| 2009/0046650 A1* | 2/2009 | Dalsgaard et al. ............. 370/329 |
| 2009/0122751 A1 | 5/2009 | Murugesu |
| 2009/0201906 A1* | 8/2009 | Fukui ............................ 370/345 |
| 2009/0245252 A1* | 10/2009 | Konishi et al. ................. 370/390 |
| 2009/0327828 A1* | 12/2009 | Ojala et al. .................... 714/749 |
| 2010/0039969 A1* | 2/2010 | Sukenari et al. .............. 370/310 |
| 2010/0081394 A1* | 4/2010 | Mashimo ........................ 455/70 |

(Continued)

FOREIGN PATENT DOCUMENTS

| JP | 10-308698 | 11/1998 |
| JP | 2006-197032 | 7/2006 |

(Continued)

OTHER PUBLICATIONS

Office Action of Japanese Patent Application No. 2011-234113 dated Apr. 21, 2015 with Partial Translation.

(Continued)

*Primary Examiner* — Chirag Shah
*Assistant Examiner* — Suk Jin Kang
(74) *Attorney, Agent, or Firm* — Katten Muchin Rosenman LLP

(57) ABSTRACT

A wireless station includes a receiver configured to receive a packet, a processor configured to set a retransmission start time of a packet transmitted to another wireless station based on the received packet, and a transmitter configured to control transmission of a packet that is the same as the transmitted packet in accordance with whether a response signal responsive to the transmitted packet is received before the set retransmission start time is reached.

16 Claims, 18 Drawing Sheets

(56) References Cited

U.S. PATENT DOCUMENTS

| | | | | |
|---|---|---|---|---|
| 2010/0329178 | A1* | 12/2010 | Cordeiro | 370/328 |
| 2010/0329231 | A1* | 12/2010 | Sekiya et al. | 370/345 |
| 2011/0110345 | A1* | 5/2011 | Heidari et al. | 370/338 |
| 2011/0246846 | A1* | 10/2011 | Ojala et al. | 714/748 |
| 2012/0300758 | A1* | 11/2012 | Turunen et al. | 370/338 |
| 2013/0003751 | A1* | 1/2013 | Huse | 370/412 |

FOREIGN PATENT DOCUMENTS

| | | |
|---|---|---|
| JP | 2008-160237 | 7/2008 |
| JP | 2009-141507 | 6/2009 |
| JP | 2009-230406 | 10/2009 |

OTHER PUBLICATIONS

European Search Report dated Oct. 1, 2015, from the corresponding EP Application No. EP 12 18 5609.0-1851.

Alam M M et al: "CRRT: Congestion-Aware and Rate-Controlled Reliable Transport in Wireless Sensor Networks". IEICE Transactions on Communications, Communications Society. Tokyo , JP, vol. E92B, No. 1. Jan. 1, 2009, pp. 184-199. XP001523534. ISSN: 0916-8516. DOI: 10.1587/TRANSCOM.E92. B.184 * p. 186; figure 1.

Kisuk Kweon et al: "A Retransmission-Enhanced Duty-Cycle Mac Protocol Based on the Channel Quality for Wireless Sensor Networks". IEICE Transactions on Communications, Communications Society. Tokyo . JP. vol. E93B, No. 11. Nov. 1, 2010. pp. 3156-3160, XP001559494, ISSN: 0916-8516, DOI: 10.1587/TRANSCOM.E93. B.3156* Section 2; p. 3157-p. 3159.

Jian Liu et al: "ATCP: TCP for Mobile Ad Hoc Networks", IEEE Journal on Selected Areas in Communications, IEEE Service Center, Piscataway, US, vol . 19, No. 7, Jul. 1, 2001, XP011055411, ISSN: 0733-8716 * Reference [7]; p. 1302, left-hand col.

Daiqin Yang et al: "Simulation-Based Comparisons of Solutions for TCP Packet Reordering in Wireless Networks", IEEE Wireless Communications and Networking Conference, 2007, WCNC 2007, Mar. 11-15, 2007, Hong Kong, IEEE Operations Center, Piscataway, NJ, Mar. 1, 2007, pp. 3238-3243, XP031097735, ISBN: 978-1-4244-0658-6 * p. 3242.

Kawai T et al: "Proposal of an Assured Corridor Mechanism for Urgent Information Transmission in Wireless Sensor Networks", IEICE Transactions on Communications, Communications Society, Tokyo, JP, vol . E90B, No. 10, Oct. 1, 2007, pp. 2817-2826, XP001508610, ISSN: 0916-8516, DOI: 10 .1093/IETCOM/E90-B. 10 .2817.

* cited by examiner

FIG. 18

| CONDITION OF DATA TRANSMITTER WIRELESS STATION | RESPONSE TIME LIMIT |
|---|---|
| TRANSMISSION INHIBITION PERIOD | TRANSMISSION INHIBITION PERIOD END TIME + ROUNDTRIP DELAY TIME |
| TRANSMISSION PERMITTED PERIOD | CURRENT TIME + ROUNDTRIP DELAY TIME |
| UNKNOWN | CURRENT TIME + MINIMUM QUIESCENCE PERIOD + ROUNDTRIP DELAY TIME |

WIRELESS STATION, COMMUNICATION SYSTEM, AND COMMUNICATION METHOD

CROSS-REFERENCE TO RELATED APPLICATION

This application is based upon and claims the benefit of priority of the prior Japanese Patent Application No. 2011-234113, filed on Oct. 25, 2011, the entire contents of which are incorporated herein by reference.

FIELD

Embodiments discussed herein are related to a wireless station, a communication system, and a communication method for performing wireless communication.

BACKGROUND

In recent years, people have become increasingly aware of the importance of environment protection and energy conservation. Therefore, it is desirable that visualized information regarding $CO^2$ emissions and electricity use be collected where appropriate and an optimum amount of energy be supplied. To realize such a requirement, an understanding of various situations on a site, such as electricity use and greenhouse gas emissions, is to be timely and accurately gained.

Accordingly, a sensor network that acquires data from widely distributed sensors that sense, for example, electricity use and greenhouse gas emissions has attracted attention. In particular, an ad hoc wireless network in which the sensors have a wireless communication capability and autonomously set up a network of a plurality of wireless stations has attracted attention.

The wireless stations in the ad hoc network may communicate with one another without using a base station and an access point. Accordingly, the ad hoc network does not depend on a particular network infrastructure. Thus, a new wireless station may be added to the ad hoc network without registration of the new connected wireless station and, therefore, a new wireless station may be easily added.

In this way, by employing an ad hoc network in order to realize the above-described service, an observation point may be added as appropriate and, therefore, an understanding of situations throughout a wide area may be gained.

However, if an ad hoc network is employed, the data transfer efficiency may be disadvantageously decreased among the wireless stations in the ad hoc network.

For example, according to the transmission time restriction for Telemeter and Telecontrol (including accompanied data) using a radio frequency in the range from 426.025 MHz to 426.1375 MHz defined in the ARIB STD-T67 standard, the maximum transmission period is 5 seconds and the minimum quiescence period is 2 seconds. If this restriction is imposed on a wireless station, the wireless station stops transmitting a packet within 5 seconds after it has transmitted the packet. In addition, the wireless station does not start transmitting any packet until 2 seconds have elapsed from the end of transmission.

Such a restriction is defined to give all of the wireless stations that use the above-described frequency range an opportunity to transmit a packet. In addition, for another unlicensed frequency range that is used by convenience radio stations, a transmission time restriction is defined. For example, each of ARIB STD-30, ARIB STD-T67, ARIB STD-T93, and ARIB STD-96 defines its own transmission time restriction.

That is, under such a transmission time restriction, if the maximum transmission period has elapsed since the wireless station started transmitting a packet, the wireless station is forced to stop transmitting any packet for the minimum quiescence period. Accordingly, the data transfer efficiency, that is, the number of transmitted frames per unit time is significantly decreased.

To address such an issue, a technology for increasing the data transfer efficiency by using a transmitter wireless station that multiplexes a plurality of communication data items destined for a plurality of receiver wireless stations has been developed (refer to, for example, Japanese Laid-open Patent Publication No. 2009-141507).

SUMMARY

According to an aspect of the invention, a wireless station includes a receiver configured to receive a packet, a processor configured to set a retransmission start time of a packet transmitted to another wireless station based on the received packet, and a transmitter configured to control transmission of a packet that is the same as the transmitted packet in accordance with whether a response signal responsive to the transmitted packet is received before the set retransmission start time is reached.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 18 illustrates a correspondence table used for setting a response time limit according to the first to sixth exemplary embodiments of the present disclosure.

DESCRIPTION OF EMBODIMENTS

Figure 1:
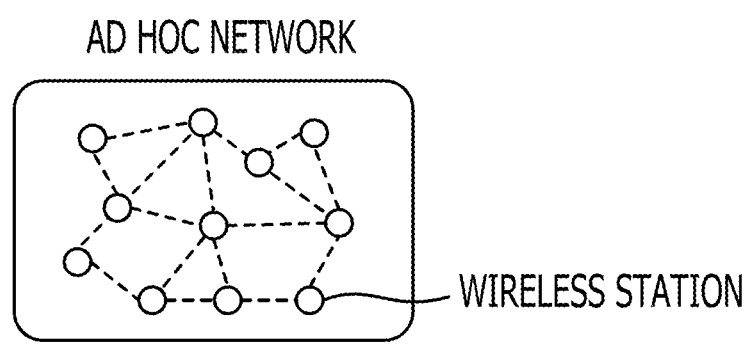
FIG. 1 is a schematic illustration of an ad hoc network according to the first exemplary embodiment of the present disclosure.

The embodiments of the present disclosure are described below with reference to the accompanying drawings.

While inventing the present embodiments, observations were made regarding a related art. Such observations include the following, for example.

In an ad hoc network, even when a technology of the related art is applied, the data transfer efficiency may be significantly decreased in a frequency range having a transmission time restriction.

Each of the wireless stations in an ad hoc network has a router function and performs multi-hop communication in which data is relayed by another station. That is, if it is difficult for a transmitter wireless station to directly communicate with a receiver wireless station, the transmitter wireless station automatically finds a communication path to the receiver wireless station to communicate with the wireless station.

In the multi-hop communication, the number of hops increases with the scale of the ad hoc network. In addition, since wireless communication is easily interfered by weather conditions and external noise received from, for example, peripheral devices, the probability of packet loss increases with an increase in the number of hops.

Accordingly, in an ad hoc network, the wireless stations send acknowledgement to each other. When a transmitter wireless station transmits a packet to a receiver wireless station and if the receiver wireless station receives the packet, the receiver wireless station sends, to the transmitter wireless station, an acknowledgement signal (ACK) responsive to the packet. That is, the transmitter wireless station confirms that the communication is successful by receiving ACK from the receiver wireless station.

In such a case, the wireless station under transmission time restriction is inhibited to transmit a packet between the time when the maximum transmission period ends and the time when the minimum quiescence period ends.

In addition, according to the above-described standard, all of the wireless stations have the same maximum transmission period and minimum quiescence period. However, for example, the start time of the maximum transmission period and the start time of the minimum quiescence period vary in accordance with the communication situation of each of the wireless stations. That is, it is difficult for a wireless station to determine whether another wireless station is inhibited to transmit a packet at the present moment.

Consequently, if a wireless station receives a packet from another station during a packet transmission inhibition period, the wireless station that has received the packet is unable to send back ACK.

Thus, since the wireless station that has transmitted the packet does not receive ACK responsive to the transmitted packet, the wireless station determines that the packet transmission fails and, therefore, the wireless station retransmits the packet.

That is, even when, like the technology of the related art, the transmitter wireless station transmits multiple data, the receiver wireless station is unable to send back ACK if the receiver wireless station receives the multiple data during the transmission inhibition period. Since the transmitter wireless station has not received ACK, the transmitter wireless station retransmits the multiple data that have already been received by the receiver wireless station.

As described above, in a frequency band having transmission time restriction, unnecessary packet retransmission between the wireless stations may occur.

Accordingly, the embodiments of the present disclosure provides a technology for increasing the packet data transfer efficiency between the wireless stations.

In the following embodiments, a wireless station waits until it receives a response signal from another station and computes a point in time at which it starts retransmitting a packet. However, application of the exemplary embodiments is not limited to a packet retransmission process.

For example, a point in time that is computed in the same manner may be used as a point in time at which a wireless station transmits a packet to another station.

To address the above-described issue, the transmitter wireless station waits for an ACK returned from the receiver wireless station while taking into account a transmission time restriction imposed on the receiver wireless station.

As described above, if the receiver wireless station receives a packet during a period of time during which the receiver wireless station is inhibited to send a packet (hereinafter referred to as a "transmission inhibition period"), the receiver wireless station is unable to immediately return an ACK. Accordingly, the receiver wireless station returns an ACK to the transmitter wireless station after the transmission inhibition period has expired.

Thus, in order for the transmitter wireless station to wait for a response signal, it is desirable that the transmitter wireless station take into account the transmission time restriction imposed on the receiver wireless station and wait for the response signal until the transmission inhibition period for the receiver wireless station expires.

However, the transmitter wireless station is not aware of the communication conditions of the receiver wireless station and, thus, the transmitter wireless station is unable to determine whether the current time of the receiver wireless station is within the transmission inhibition period.

Assume that a point in time at which the transmitter wireless station transmits a packet is substantially the same as a point in time at which the receiver wireless station receives the packet.

Then, in order for the wireless stations to reliably send an acknowledgement to each other, the transmitter wireless station may regard the point in time at which the transmitter wireless station transmits a packet as the point in time at which the transmission inhibition period of the receiver wireless station starts. Thus, the transmitter wireless station may wait for a response signal until a longest length of the transmission inhibition period elapses.

How to obtain the longest length of the transmission inhibition period is described next.

As described above, the transmission inhibition period is defined as a period of time from the time the maximum transmission period ends to the time the minimum quiescence period ends. Each of the maximum transmission period and the minimum quiescence period is a given period of time. However, the start time and the end time of each of the periods vary with the communication conditions of the wireless station.

For example, let 2T denote the maximum transmission period, and let T denote the minimum quiescence period. Then, the wireless station transmits a packet during the time period T.

If the wireless station starts transmitting a packet at time 0 (i.e., a packet transmission start time=time 0), the wireless station completes transmitting the packet at time T (i.e., the packet transmission end time=the packet transmission start time+the packet transmission period T).

In the following descriptions, for clarity, if the term "time" refers to the length of time, the term "period" is used where appropriate. In addition, the term "point in time" necessarily represents a specific point in time. For example, a point in time after some minutes has elapsed since the current time may be used.

The minimum quiescence period is defined as a period of time during which a wireless station is not allowed to transmit a packet after packet transmission performed by the wireless station has ended. Accordingly, the minimum quiescence period starts at the packet transmission end time T (i.e., the minimum quiescence period start time=the packet transmission end time). In addition, if the minimum quiescence period T has elapsed since the minimum quiescence period start time T, the minimum quiescence period end time is reached. Accordingly, the minimum quiescence period end time is a time 2T (i.e., the minimum quiescence period end time=the minimum quiescence period start time+the minimum quiescence period).

In addition, the maximum transmission period is defined as a period of time during which a wireless station may transmit a packet and the subsequent packet without waiting for the minimum quiescence period. Accordingly, the maximum transmission period start time is the time 0 (i.e., the maximum transmission period start time=the packet transmission start time). The maximum transmission period end time is the time 2T (the maximum transmission period end time=the maximum transmission period start time+the maximum transmission period).

Hereinafter, the transmission inhibition period is discussed.

As described above, the maximum transmission period end time is a time 2T, which is a point in time at which the maximum transmission period 2T has elapsed from the maximum transmission period start time 0. Note that as noted above, after a wireless station completes transmitting a packet, the wireless station may transmit the next packet during the maximum transmission period.

That is, during a period of time from the packet transmission end time T to the maximum transmission period end time 2T, transmission of a packet is not inhibited. However, after the maximum transmission period 2T has elapsed, the wireless station is inhibited to transmit a packet for the minimum quiescence period.

Thus, after the wireless station completes transmitting a packet, the wireless station is forced to stop transmitting a packet for at least the minimum quiescence period.

In the above-described example, the minimum quiescence period end time is the time 2T.

As described above, the maximum transmission period end time is the same as the minimum quiescence period end time (i.e., the time 2T). Therefore, the transmission inhibition period of the wireless station is 0. That is, it may be seen that the wireless station waits for at least the minimum quiescence period T after the wireless station completes transmitting a packet.

The case in which a wireless station transmits a packet from the time 0 to the time 2T under the restriction that the maximum transmission period=2T and the minimum quiescence period=T is discussed below.

If computation is performed in the same manner as described above, the packet transmission start time and the packet transmission end time of the wireless station are the times 0 and 2T, respectively. In addition, the minimum quiescence period start time and the minimum quiescence period end time are the times 2T and 3T, respectively. Furthermore, the maximum transmission period start time and the maximum transmission period end time are times 0 and 2T, respectively.

In such a case, after the maximum transmission period end time, the wireless station is inhibited to transmit a packet for at least the minimum quiescence period. At that time, since the minimum quiescence period end time is the time 3T, the wireless station is inhibited to transmit a packet for a period of time from the time 2T to the time 3T. Accordingly, the transmission inhibition period is defined as a period of time from the time 2T to the time 3T.

As described above, it may be seen that the transmission inhibition period varies with the communication conditions of the wireless station.

The transmission inhibition period is maximized if the wireless station transmits a packet until the maximum transmission period end time is reached without having the minimum quiescence period. At that time, the wireless station is forced to stop transmitting a packet until the minimum quiescence period elapses from the packet transmission end time. Thus, the minimum quiescence period start time is the same as the packet transmission end time, and the minimum quiescence period end time is a point in time at which the minimum quiescence period has elapsed from the packet transmission end time. In addition, since the wireless station is inhibited to transmit a packet without having the minimum quiescence period after the maximum transmission period is over, the wireless station is inhibited to transmit a packet during a period of time from the maximum transmission period end time to the minimum quiescence period end time.

That is, the maximum transmission period end time is the same as the packet transmission end time, and the packet transmission end time is the same as the minimum quiescence period start time. Thus, the transmission inhibition period is defined as a period of time from the minimum quiescence period start time to the minimum quiescence period end time.

The above discussion indicates that the longest length of the transmission inhibition period is the minimum quiescence period.

In this manner, the longest length of the transmission inhibition period is computed as the minimum quiescence period. Thus, if the transmitter wireless station does not receive an ACK from the receiver wireless station within the longest length of the minimum quiescence period since the packet transmission end time, the transmitter wireless station retransmits the packet.

In this way, the transmitter wireless station does not perform unnecessary packet retransmission caused by the transmission time restriction and, therefore, the data transfer efficiency may be improved. In addition, since unnecessary packet retransmission is not performed and, thus, unnecessary wireless resources are not used, the number of wasted wireless resources may be reduced. Furthermore, since the transmitter wireless station may reduce the number of the retransmission process, the power consumption may be reduced.

In the above description, the point in time at which the transmitter wireless station is to retransmit a packet is obtained. However, that time may be used as a point in time at which the transmitter wireless station is to transmit a new packet. For example, as in the above-described example, by transmitting a packet at a time when the longest length of the transmission inhibition period has elapsed since reception of a packet transmitted from the receiver wireless station (overhearing), the transmitter wireless station may be immediately aware of packet reception without waiting for a response signal.

First Exemplary Embodiment

However, when the transmitter wireless station waits for the response signal until the longest length of the transmission inhibition period has elapsed each time, retransmission of the packet is delayed, since the packet is retransmitted only when the receiver wireless station fails to receive the packet and the transmitter wireless station determines that the transmission was unsuccessful after the longest length of the transmission inhibition period has elapsed.

That is, by simply waiting for a response signal while taking into account the transmission time restriction, the data transfer efficiency is not satisfactorily increased.

The following exemplary embodiments are aimed to reduce the retransmission delay in addition to reliably receiving an acknowledgement.

While the following exemplary embodiments are described with reference to an ACK in the form of a response signal, the response signal is not limited to an ACK. For example, the response signal may be a negative ACK (NACK) or a selective ACK.

Also, it is to be noted that those skilled in the art may easily modify the processes performed by the wireless station, the communication system, and the communication method when such a response signal other than the ACK is employed.

In addition, as described above, the computed time may be used as the time to transmit a new packet instead of the time to retransmit the packet.

As used herein, the term "estimation of a transmission inhibition period" refers to computation of a transmission inhibition period using, for example, a central processing unit (CPU). Note that the wireless station, the communication system, and the communication method do not have any intelligence. This also applies to other terms implying intelligence.

According to the first exemplary embodiment, a wireless station receives a packet and determines a retransmission start time for a packet transmitted to another station based on the received packet. Thereafter, the wireless station controls transmission of a packet that is the same as the transmitted packet in accordance with whether the wireless station receives a response signal to the transmitted packet before the determined retransmission start time.

Alternatively, according to the first exemplary embodiment, the wireless station may receive a packet and estimates a time at which a transmitter wireless station of the packet may transmit a packet based on the received packet. Thereafter, when the wireless station transmits a packet to the transmitter wireless station, the wireless station may transmit the packet to the transmitter wireless station based on the estimated packet transmittable time.

The wireless station, the communication system, and the communication method according to the first exemplary embodiment are described below with reference to FIGS. 1 to 8.

FIG. 1 is a schematic illustration of an ad hoc network.

The present exemplary embodiment is applicable to a network in which wireless stations communicate with one another, such as an ad hoc network.

An ad hoc network includes only a plurality of wireless stations.

That is, in an ad hoc network, the wireless stations are connected to one another without using an access point. Even the wireless stations located beyond the range of the radio waves may communicate with each other via another station.

In an ad hoc network, in order to establish communication, the wireless stations that are located within a communicable range, use multicast communication called broadcast. The wireless stations located in the communicable range respond to a broadcast signal. Thereafter, authentication and communication establishment are performed between the wireless stations. In this way, the network is formed.

Such a distributed autonomous wireless network includes a plurality of wireless stations in a particular communicable area range of each of the wireless stations. If any one of the wireless stations in the communicable area range broadcasts under such a condition and is authenticated, the wireless station may join the network.

In addition, the wireless station in the ad hoc network performs carrier sense before transmitting a packet. The carrier sense is performed to determine whether a desired frequency is not in use. The wireless station measures reception power at the desired frequency. If the reception power is lower than or equal to the rated value, the wireless station starts communication. However, if the desired frequency is in use, the wireless station delays packet transmission until the frequency is no longer in use.

When a plurality of the wireless stations want to use the frequency and if the wireless stations attempt to transmit packets immediately after the frequency is no longer used, it is highly likely that collision of packets from the wireless stations occurs. Accordingly, all of the wireless stations are forced to delay transmitting a packet for a random amount of time.

This process is performed by counting down a timer called a backoff timer set to a random time value. When the value of the backoff timer of one of the wireless stations reaches 0 and if the desired frequency is available at that time, the wireless station may transmit a packet. If the desired frequency is in use before the timer expires, the wireless station stops counting down the timer until the frequency is no longer in use. When the frequency becomes available again, the wireless station starts counting down the timer. In this manner, all of the wireless stations may reliably access the frequency in an equitable manner.

In addition, in an ad hoc network, the wireless station that has received a packet decodes the MAC header of the packet and determines the destination. If the packet is not destined for that wireless station, the wireless station determines whether the destination matches one of the wireless stations contained in route information maintained therein. If the destination does not match any one of the wireless stations in the route information, the wireless station discards the packet.

Accordingly, in an environment in which a plurality of wireless stations are located so as to communicate with one another in the same network, such as an ad hoc network, each of the wireless stations also receives a packet destined for another wireless stations located in the communicable area range of the wireless station. This operation is referred to as "overhearing".

Note that the route information is used when multi-hop communication is performed. The route information includes a correspondence between the destination of a packet and the next hop address (the next destination). Accordingly, if the destination of the received packet is contained in the route information, the wireless station sends the packet to the next hop address corresponding to the destination of the received packet.

According to the first exemplary embodiment, the wireless station, the communication system, and the communication method have significant advantage in the above-described ad hoc network. However, the present exemplary embodiment is also applicable to a network other than an ad hoc network.

Figure 2:
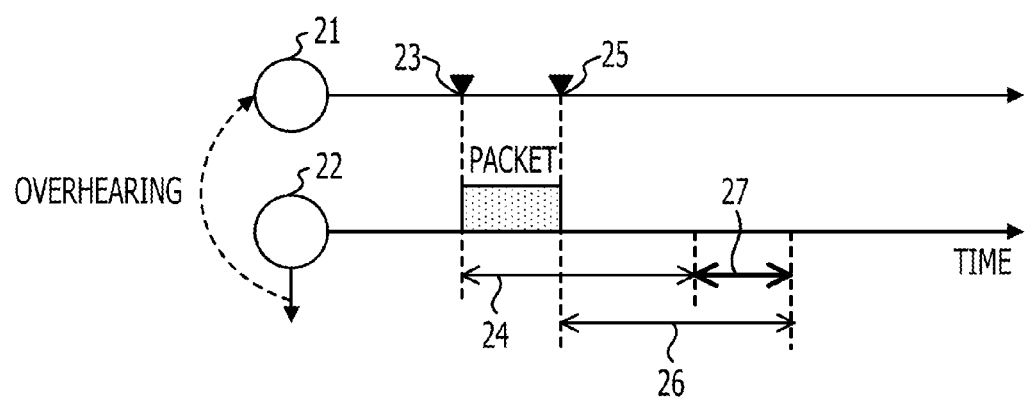
FIG. 2 is a schematic illustration of the first exemplary embodiment of the present disclosure of the present disclosure.

FIG. 2 is a schematic illustration of the first exemplary embodiment of the present disclosure.

As illustrated in FIG. 2, a wireless station 21 is located in the same network as a wireless station 22 so as to be communicable with the wireless station 22. The wireless station 21 overhears a packet related to the wireless station 22.

The wireless station 22 sends a packet to a wireless station other than the wireless station 21.

At reception start time 23, the wireless station 21 starts receiving a packet from the wireless station 22 by overhearing. At that time, the wireless station 21 may estimate that a transmission start time 23 of the packet sent from the wireless station 22 is the same as the reception start time of the packet received from the wireless station 22.

A maximum transmission period 24 represents a prescribed time length. In addition, during the maximum transmission period 24 of the wireless station 22, the wireless station 22 may transmit a packet without setting a minimum quiescence period (described in more detail below). For example, according to ARIB STD-T96, the maximum transmission period 24 is 100 ms.

At a reception end time 25, the wireless station 21 completes receiving the packet sent from the wireless station 22. As in the estimation for the transmission start time, the wireless station 21 estimates that the transmission end time of the packet sent from the wireless station 22 is the same as the reception end time 25 of the packet received from the wireless station 22.

Like the maximum transmission period 24, a minimum quiescence period 26 represents a prescribed time length. During the minimum quiescence period 26 of the wireless station 22, the wireless station 22 is forced to stop transmitting any packet. After transmitting a packet, the wireless station 22 is forced to stop transmitting any packet for at least the minimum quiescence period. For example, according to ARIB STD-T96, the minimum quiescence period 26 is 100 ms.

A transmission inhibition period 27 starts at a time immediately after the maximum transmission period 24 ends and ends at a time when the minimum quiescence period 26 ends. During the transmission inhibition period 27, the wireless station 22 may receive a packet. However, the transmission inhibition period 27 is not allowed to transmit a packet. That is, even when the wireless station 22 receives a packet from another station during the transmission inhibition period 27, the wireless station 22 is not allowed to return an ACK to the wireless station that has sent the packet. Accordingly, upon receiving a packet during the transmission inhibition period 27, the wireless station 22 returns an ACK after the transmission inhibition period 27 ends.

According to the first exemplary embodiment, the wireless station, the communication system, and the communication method estimate the transmission inhibition period 27 described above and determine whether the packet is successfully received by waiting for an ACK for a period of time based on the result of estimation.

A method for estimating the transmission inhibition period 27 according to the first exemplary embodiment is described next.

As described above, the wireless station 21 overhears a packet related to the wireless station 22 and estimates the transmission start time and the transmission end time from the reception start time 23 and the reception end time 25 of the packet.

The start time of the transmission inhibition period 27 is the same as the end time of the maximum transmission period 24. At that time, the time when the maximum transmission period 24 has elapsed from the estimated packet transmission start time indicates the end time of the maximum transmission period 24. Thus, the start time of the transmission inhibition period 27 is estimated to be the end time of the maximum transmission period 24.

In this manner, the wireless station 21 may estimate the start time of the transmission inhibition period 27 of the wireless station 22 (i.e., the start time of the transmission inhibition period=the maximum transmission period end time).

The end time of the transmission inhibition period 27 is the same as the end time of the minimum quiescence period 26. At that time, the time when the minimum quiescence period 26 has elapsed from the estimated packet transmission end time indicates the minimum quiescence period end time. Thus, the end time of the minimum quiescence period 26 is defined as the end time of the transmission inhibition period 27.

In this manner, the wireless station 21 may estimate the end time of the transmission inhibition period 27 of the wireless station 22 (i.e., the end time of the transmission inhibition period=the minimum quiescence period end time).

As described above, the wireless station 21 may estimate the start time and the end time of the transmission inhibition period 27 of the wireless station 22. That is, the wireless station 21 may estimate the transmission inhibition period 27 by estimating the packet transmission start time and the packet transmission end time of the wireless station 22.

Thereafter, the wireless station 21 sets the retransmission start time using the transmission inhibition period 27 estimated in the above-described manner.

Figure 3:
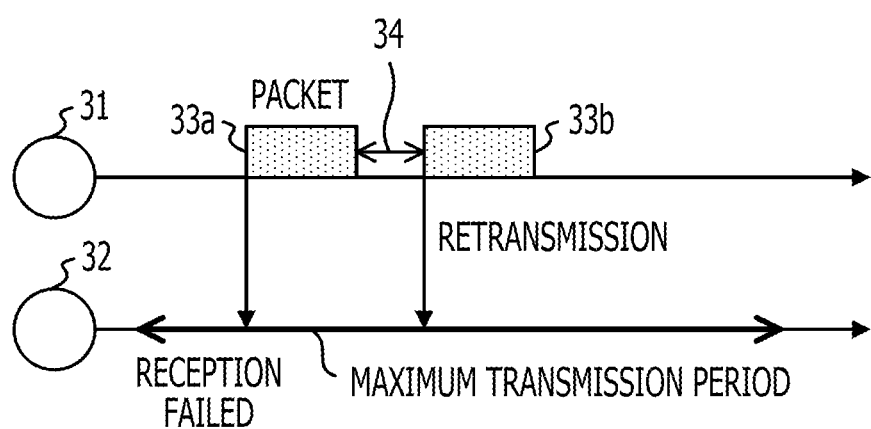
FIG. 3 illustrates an example 1 of setting a response time limit according to the first exemplary embodiment of the present disclosure.

FIG. 3 illustrates an example 1 of setting a response time limit according to the first exemplary embodiment.

As used herein, the term "response time limit" refers to the time until which a wireless station is to wait for a returned response signal. A wireless station determines whether packet transmission is successful by determining whether it receives the response signal before the response time limit. If the wireless station determines that the packet transmission is unsuccessful, the wireless station retransmits the packet.

The following description is made while focusing on the response time limit. However, the same result may be obtained by focusing on the retransmission start time and determining whether packet transmission is successful by determining whether the response signal is received before the retransmission start time.

As illustrated in FIG. 3, a wireless station 31 transmits a packet 33a to a wireless station 32. At that time, the current time of the wireless station 32 is within the maximum transmission period. That is, the wireless station 32 may transmit a packet without setting the minimum quiescence period.

The wireless station 31 estimates the transmission inhibition period of the wireless station 32. As a result, the wireless station 31 determines that the current time of the wireless station 32 is outside the transmission inhibition period.

At that time, the time at which the wireless station 32 receives the packet 33a is within the maximum transmission period of the wireless station 32. Accordingly, upon receiving the packet, the wireless station 32 may immediately return an ACK.

Thus, the wireless station 31 may set a response time limit 34 for an ACK response to the packet 33a so that the response time limit 34 is reached early. If the wireless station 31 does not receive an ACK response to the packet 33a before the response time limit 34 is reached, the wireless station 31 determines that transmission of the packet 33a is unsuccessful and, therefore, the wireless station 31 retransmits a packet 33b that is the same as the packet 33a to the wireless station 32.

At that time, the response time limit 34 is set in accordance with the distance between the wireless station 31 and the wireless station 32 and a roundtrip time of the packet that travels between the wireless station 31 and the wireless station 32 (i.e., a roundtrip delay time). That is, the response time limit 34 is set while taking into account the period of time from transmission of the packet 33a to reception of the packet 33a and the period of time from transmission of an ACK response to the packet 33a to reception of the ACK.

Alternatively, the response time limit 34 may be set based on a value defined by IEEE 802.11 (i.e., SIFSTime+SlotTime+PHY-RX-START-Delay). SIFSTime (Short Inter Frame Space Time) represents a minimum waiting time in the packet transmission intervals. When a packet is received, an ACK is transmitted after SIFSTime has elapsed. SlotTime represents a period of time during which a frame having a minimum size (excluding the preamble) is transmitted. PHY-RX-START-Delay represents a period of time during which a wireless station is switched between a reception mode and a transmission mode.

As described above, in order for the wireless station 31 to transmit a packet to the wireless station 32 within the maximum transmission period of the wireless station 32, it is desirable that the response time limit for the packet be set so as to be an early time.

If the response time limit is set so as to be early, the packet may be retransmitted in a short time even when the wireless station 32 does not receive a packet, as compared with the case where the longest length of the transmission inhibition period is taken into account.

In addition to the case illustrated in FIG. 3, the wireless station 32 may stop transmitting a packet for the minimum quiescence period or longer. Even in such a case, as described above, it is desirable that the response time limit be set in the above-described manner.

That is, if a point in time at which the wireless station 31 transmits a packet to the wireless station 32 is outside the transmission inhibition period, the wireless station 31 sets the response time limit in accordance with the roundtrip delay time.

In this manner, unnecessary retransmission caused by the transmission time restriction may be reliably avoided. Accordingly, the wireless resource usage efficiency may be increased. Furthermore, the retransmission control process may be sped up as compared with the case in which the response time limit is set in accordance with the longest length of the transmission inhibition period. Consequently, the data transfer efficiency may be increased.

Figure 4:
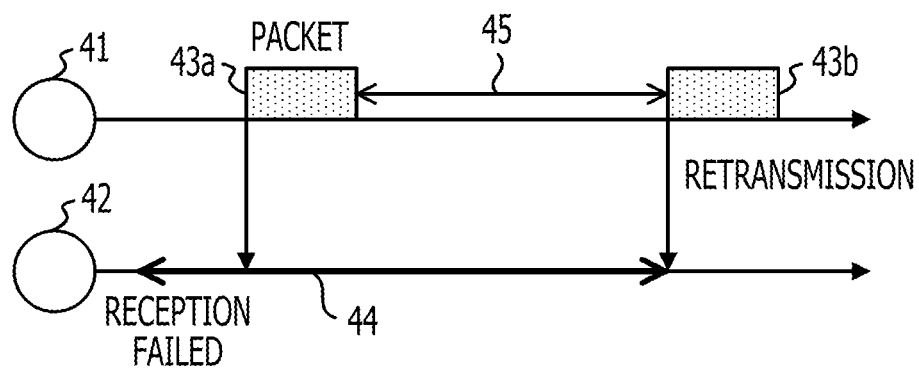
FIG. 4 illustrates an example 2 of setting a response time limit according to the first exemplary embodiment of the present disclosure.

FIG. 4 illustrates an example 2 of setting a response time limit according to the first exemplary embodiment.

As illustrated in FIG. 4, a wireless station 41 transmits a packet 43a to a wireless station 42. At that time, the current time of the wireless station 42 is within the transmission inhibition period.

The wireless station 41 estimates the transmission inhibition period of the wireless station 42. As a result, the wireless station 41 determines that the current time of the wireless station 42 is within the transmission inhibition period.

In addition, the wireless station 41 determines that the time at which the packet 43a is transmitted is within the estimated transmission inhibition period.

At that time, if the wireless station 42 receives the packet 43a, the wireless station 42 is unable to immediately transmit an ACK, since the current time of the wireless station 42 is within the transmission inhibition period. Accordingly, the wireless station 42 returns an ACK responsive to the packet 43a after the transmission inhibition period ends.

Accordingly, the wireless station 41 sets a response time limit 45 in accordance with the end time of a transmission inhibition period 44.

For example, the wireless station 41 sets the response time limit 45 to the time at which the roundtrip delay time has elapsed from the end time of the estimated transmission inhibition period 44. If an ACK responsive to the packet 43a is not returned before the set response time limit 45, the wireless station 41 determines that the transmission of the packet 43a is unsuccessful. Thereafter, the wireless station 41 retransmits, to the wireless station 42, a packet 43b that is the same as the transmitted packet.

As described above, according to the first exemplary embodiment, the wireless station and the communication system set the response time limit for the response signal in accordance with the estimated transmission inhibition period. In this manner, unnecessary retransmission caused by the transmission time restriction may be reliably avoided. Accordingly, the wireless resource is not wasted. In addition, the data transfer efficiency may be increased. Furthermore, since an unnecessary retransmission process is not performed, waste power consumption of the wireless station may be avoided.

Thus, according to the first exemplary embodiment, the wireless station, the communication system, and the communication method may estimate the transmission inhibition period based on a received packet and set the response time limit for the response signal in accordance with the transmission inhibition period. Therefore, a retransmission delay may be reduced, as compared with the case where the response time limit is set while taking into account the longest length of the transmission inhibition period in advance. That is, the data transfer efficiency may be further increased.

FIG. 18 illustrates a table indicating the correspondence between an estimated transmission inhibition period and a response time limit.

As illustrated in FIG. 4, when the wireless station transmits a packet within a transmission inhibition period of the wireless station that is the destination of the packet, the response time limit may be computed as follows:

the response time limit=the transmission inhibition period end time+the roundtrip delay time.

In contrast, as illustrated in FIG. 3, when the wireless station transmits a packet outside the transmission inhibition period of the wireless station that is the destination of the packet, the response time limit may be computed as follows:

the response time limit=the current time+the roundtrip delay time.

Furthermore, the response time limit set when it is difficult to estimate the transmission inhibition period is discussed next.

The wireless stations located in the same network have the same transmission time restriction, and only the wireless stations that meet the transmission time restriction may communicate with one another. That is, a wireless station with which the wireless station communicates also has the transmission inhibition period.

Accordingly, in order to reliably determine whether the transmission is successful, the response time limit is set to a time after the longest length of the transmission inhibition period has elapsed since the packet transmission start time of the transmitter wireless station.

That is, if, for some reason, it is difficult to estimate the transmission inhibition period of the wireless station which is the destination of a packet and, thus, the wireless station transmits the packet without being aware of the transmission inhibition period, the response time limit may be computed as follows:

the response time limit=the current time+the minimum quiescence period+the roundtrip delay time.

According to the first exemplary embodiment, the wireless station, the communication system, and the communication method may be achieved by including such a correspondence table.

Figure 5:
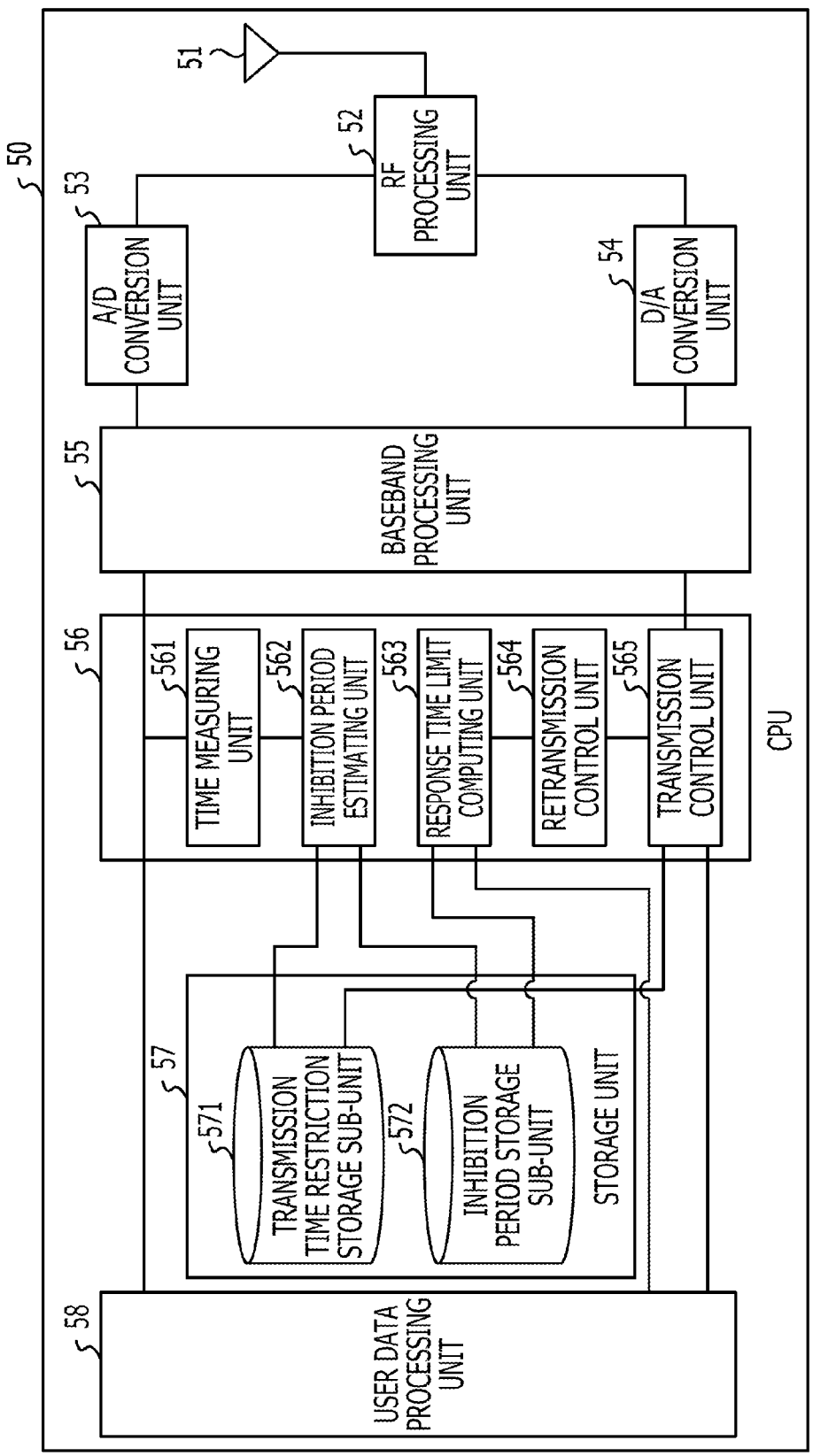
FIG. 5 is a hardware configuration diagram or a functional block diagram of a wireless station according to the first exemplary embodiment of the present disclosure.

FIG. 5 is a hardware configuration diagram or a functional block diagram of a wireless station 50 according to the first exemplary embodiment.

As illustrated in FIG. 5, the wireless station 50 includes an antenna 51, a radio frequency (RF) processing unit 52, an analog-to-digital (A/D) conversion unit 53, a digital-to-analog (D/A) conversion unit 54, a baseband processing unit 55, a central processing unit (CPU) 56, a storage unit 57, and a user data processing unit 58.

The antenna 51 emits, to other wireless stations, a wireless signal output from the RF processing unit 52 by using radio waves as a medium. In addition, the antenna 51 receives a wireless signal transmitted from the other stations using radio waves as a medium. Thereafter, the antenna 51 outputs the received wireless signal to the RF processing unit 52.

The RF processing unit 52 converts the low-frequency wireless signal input from the D/A conversion unit 54 into a high-frequency signal and outputs the high-frequency signal to the antenna 51. In addition, the RF processing unit 52 converts a high-frequency wireless signal input from the antenna 51 into an intermediate frequency signal and outputs the intermediate frequency signal to the A/D conversion unit 53.

The A/D conversion unit 53 converts the analog wireless signal input from the RF processing unit 52 into a digital form and outputs a packet to the baseband processing unit 55.

The D/A conversion unit 54 converts the packet input from the baseband processing unit 55 in a digital form into an analog signal and outputs the wireless signal to the RF processing unit 52.

The baseband processing unit 55 demodulates and decodes the packet input from the A/D conversion unit 53 and outputs the packet to the CPU 56 and the user data processing unit 58. In addition, the baseband processing unit 55 encodes and modulates a packet input from the CPU 56 and inputs the packet to the D/A conversion unit 54.

The CPU 56 is an example of the configuration that controls each functional unit. The CPU 56 executes, for example, an application program. Thus, the CPU 56 controls each of the functional units and reads/writes data from/to each storage unit.

According to the first exemplary embodiment, the CPU 56 of the wireless station 50 performs control so that the function of each of a time measuring unit 561, an inhibition period estimating unit 562, a response time limit computing unit 563, a retransmission control unit 564, and a transmission control unit 565 is executed.

Upon receiving a packet from the baseband processing unit 55, the time measuring unit 561 measures the reception start time and the reception end time of the input packet and outputs the result of the measurement to the inhibition period estimating unit 562.

The inhibition period estimating unit 562 reads the transmission time restriction (the maximum transmission period and the minimum quiescence period) from the storage unit 57 (described in more detail below). Thereafter, the inhibition period estimating unit 562 estimates the transmission inhibition period of the wireless station that transmitted the received packet from the read transmission time restriction, the reception start time and the reception end time input from the time measuring unit 561, and a terminal ID attached to the packet. Subsequently, the inhibition period estimating unit 562 outputs the result of the estimation to the storage unit 57 as inhibition period information.

While the method for estimating the transmission inhibition period has been described with reference to FIG. 2, the method is described in more detail below with reference to FIG. 8.

Upon receiving a transmission request from the user data processing unit 58, the response time limit computing unit 563 reads, from the storage unit 57, the transmission inhibition period of the wireless station representing the packet destination indicated by the transmission request received from the user data processing unit 58. Thereafter, the response time limit computing unit 563 computes the response time limit using the read inhibition period information and outputs the computed response time limit to the retransmission control unit 564 and the user data processing unit 58.

Note that the response time limit is computed in the same manner as illustrated in FIGS. 3, 4, and 18.

The retransmission control unit 564 sets the response time limit for the packet to the response time limit input from the response time limit computing unit 563. If an ACK is not returned before the response time limit, the retransmission control unit 564 outputs the packet to be retransmitted to the transmission control unit 565, which retransmits the packet. Note that if a packet that does not ask for an ACK response, the response time limit is not set.

When the wireless station 50 transmits a packet, the transmission control unit 565 of the wireless station 50 reads the transmission time restriction from the storage unit 57 and outputs the packet input from the user data processing unit 58 to the baseband processing unit 55 while complying with the transmission time restriction.

In addition, upon receiving a packet to be retransmitted from the retransmission control unit 564, the transmission control unit 565 outputs the packet to the baseband processing unit 55, which transmits the packet to the target wireless station.

According to the first exemplary embodiment, the storage unit 57 of the wireless station 50 includes a transmission time restriction storage sub-unit 571 and an inhibition period storage sub-unit 572.

The transmission time restriction storage sub-unit 571 stores information regarding the packet transmission time restriction, such as the maximum transmission period and the minimum quiescence period. In addition, the transmission time restriction storage sub-unit 571 outputs the information, such as the maximum transmission period and the minimum quiescence period, to the CPU 56 in response to a control signal received from the CPU 56.

Note that the maximum transmission period and the minimum quiescence period are given values. For example, according to ARIB STD-T67, the transmission time restriction is determined so that the maximum transmission period is 5 seconds and the minimum quiescence period is 2 seconds. Alternatively, the transmission time restriction may be determined so that the maximum transmission period is 40 seconds and the minimum quiescence period is 2 seconds.

As used herein, the term "maximum transmission period" refers to the time length during which the wireless station 50 may transmit a packet without setting a minimum quiescence period. The term "minimum quiescence period" refers to the time length for which a wireless station is not allowed to transmit any packet. The minimum quiescence period starts at the transmission end time of the last packet transmitted by the wireless station within the maximum transmission period.

The inhibition period storage sub-unit 572 stores the terminal ID and the inhibition period information input from the CPU 56. In addition, in response to the control signal input from the CPU 56, the inhibition period storage sub-unit 572 outputs the ID and the inhibition period information of the target wireless station among the inhibition period information items stored therein to the CPU 56. Note that the inhibition period information includes the time at which the inhibition period starts and the time at which the inhibition period ends. The inhibition period information may include one of the start time and the end time as appropriate. Any information that may indicate the inhibition period may be used as the inhibition period information other than the start time and the end time of the inhibition period.

The user data processing unit 58 of the wireless station 50 performs a reception process if the packet input from the baseband processing unit 55 is destined for the wireless station 50. However, if the packet input from the baseband processing unit 55 is not destined for the wireless station 50, the user data processing unit 58 performs a discard process on the packet.

If the packet is destined for a wireless station that is contained in the route information (not illustrated) maintained in the wireless station 50, the user data processing unit 58 does not perform a discard process. Note that the route information has already been illustrated in FIG. 1.

In addition, the user data processing unit 58 generates a packet to be transmitted to another station and outputs the generated packet to the transmission control unit 565.

Upon receiving a transmission request from an application, the user data processing unit 58 outputs a transmission request to the CPU 56.

Through such a processing flow, the wireless station 50 may estimate the transmission inhibition period of another wireless station based on a packet received from the wireless station. The wireless station 50 sets the response time limit using the estimated transmission inhibition period.

In addition, by estimating the transmission inhibition period, the wireless station 50 may be aware of a time period during which each of the wireless stations in the vicinity of the wireless station 50 does not transmit a packet. As illustrated in FIG. 1, before transmitting a packet, the wireless station 50 performs carrier sense. That is, if the current time of one of the stations in the vicinity of the wireless station 50 is within the transmission inhibition period, the wireless station 50 may determine that the desired frequency is not in use and, therefore, transmit a packet without performing carrier sense. In this way, the wireless station 50 may skip the carrier sense process. Thus, additionally, the power consumption may be reduced, and the wireless resource usage efficiency and the data transfer efficiency may be increased.

Figure 6:
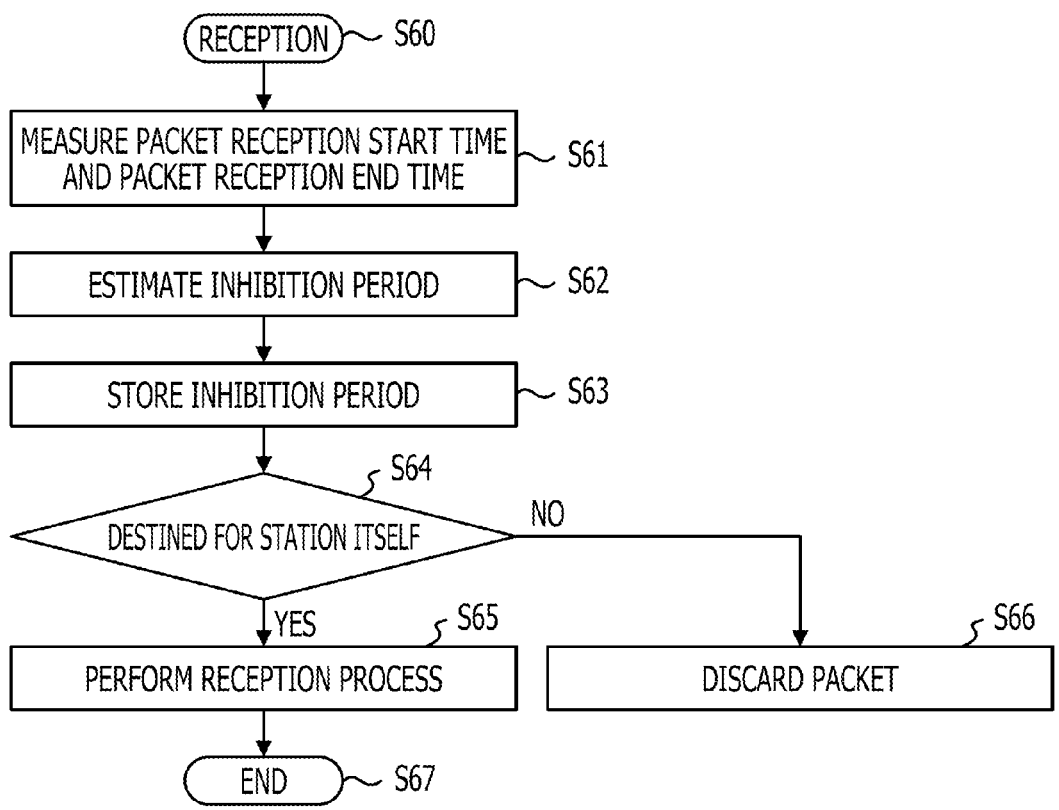
FIG. 6 is a flowchart of a packet reception process and operation performed by the wireless station according to the first exemplary embodiment of the present disclosure.

FIG. 6 is a flowchart of a packet reception process and operation performed by the wireless station according to the first exemplary embodiment.

If the wireless station 50 receives a packet from another station (step S60), the time measuring unit 561 outputs the reception start time of the packet to the inhibition period estimating unit 562. Thereafter, the time measuring unit 561 measures the reception end time of the packet and outputs the result of measurement (i.e., the reception end time) to the inhibition period estimating unit 562 (step S61).

The inhibition period estimating unit 562 estimates the transmission inhibition period using the reception start time and the reception end time input from the time measuring unit 561 and the transmission time restriction (i.e., the maximum transmission period and the minimum quiescence period) prestored in the transmission time restriction storage sub-unit 571 (step S62).

Note that the estimation process of a transmission inhibition period is described in more detail below with reference to FIG. 8.

The inhibition period estimating unit 562 outputs the estimated transmission inhibition period to the inhibition period storage sub-unit 572 as the inhibition period information. Thus, the inhibition period storage sub-unit 572 stores the transmission inhibition period (step S63).

The user data processing unit 58 determines whether the packet having the estimated transmission inhibition period and output from the baseband processing unit 55 is destined for the wireless station 50 (step S64).

If, in step S64, the packet is destined for the wireless station 50, the user data processing unit 58 performs a reception process for the packet (step S65).

Examples of the reception process includes processing of the MAC layer (e.g., identifying the type of packet and returning an ACK if the received packet is a unicast packet) and processing of an application layer (e.g., displaying received text information and image information on a screen and playing back a sound).

However, if, in step S64, the packet is not destined for the wireless station 50, the user data processing unit 58 discards the packet (step S66).

According to the first exemplary embodiment, each of the wireless stations overhears. Thus, each of the wireless stations receives a packet that is not destined for the wireless station itself. Accordingly, the wireless station discards a packet that is not destined for the wireless station itself. In this example, each of the wireless stations determines that a packet destined for any one of wireless stations contained in the route information is destined for the wireless station itself.

If the user data processing unit 58 completes the reception process or the discard process of the packet, the reception process performed by the wireless station is completed (step S67).

According to the first exemplary embodiment, through such a process flow, the wireless station may estimate the transmission inhibition period of the wireless station that transmitted the received packet based on the received packet. Thus, according to the first exemplary embodiment, the wireless station may apply the estimated transmission inhibition period to a variety of processes.

Figure 7:
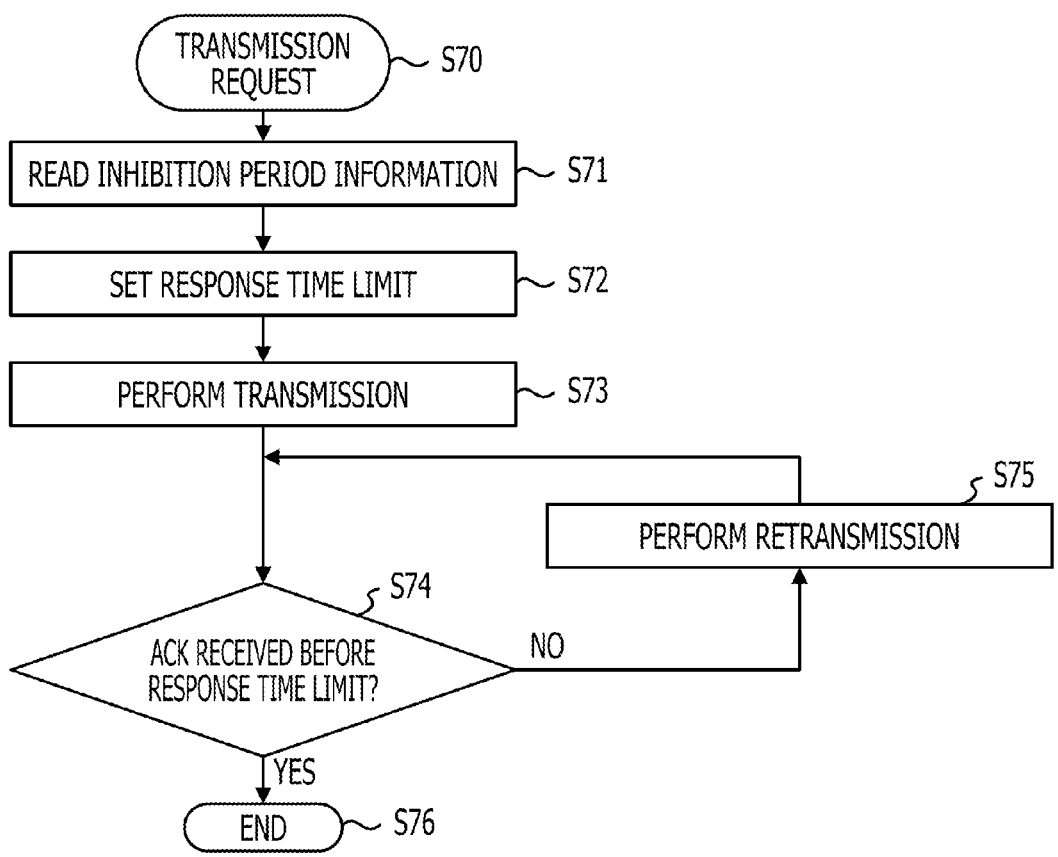
FIG. 7 is a flowchart of a packet transmission process and operation performed by the wireless station according to the first exemplary embodiment of the present disclosure.

FIG. 7 is a flowchart of a packet transmission process and operation performed by the wireless station according to the first exemplary embodiment.

Upon receiving a transmission request from an application, the user data processing unit 58 of the wireless station 50 outputs a transmission request to the response time limit computing unit 563 (step S70).

Upon receiving the transmission request, the response time limit computing unit 563 reads, from the inhibition period storage sub-unit 572, the transmission inhibition period of the wireless station that transmitted the packet (step S71).

The response time limit computing unit 563 sets the response time limit in accordance with the read transmission inhibition period (step S72).

Note that as illustrated in FIGS. 3 and 4, the response time limit is set based on the correspondence table illustrated in FIG. 18.

The transmission control unit 565 performs control so that the packet generated by the user data processing unit 58 is transmitted. Thus, the wireless station 50 transmits the packet (step S73).

The retransmission control unit 564 monitors whether an ACK is returned before the set response time limit (step S74).

If, in step S74, an ACK is not returned before the set response time limit, the retransmission control unit 564 outputs, to the transmission control unit 565, a packet to be retransmitted and performs control so that the transmission control unit 565 retransmits the packet. In this way, the wireless station 50 retransmits the packet and, thereafter, the processing returns to step S74 (step S75).

However, if, in step S74, an ACK is returned before the set response time limit, the transmission process of the packet is completed (step S76).

According to the first exemplary embodiment, through such a process flow, the wireless station may set the response time limit in accordance with the estimated transmission inhibition period. That is, according to the first exemplary embodiment, the wireless station may increase the communication efficiency of the retransmission process and the wireless resource usage efficiency. In addition, the wireless station may reduce power consumption.

The above-described description has been made with reference to the transmission process during which the transmission inhibition period is read. However, if a new packet is received during the transmission process, the transmission inhibition period may be estimated based on the received packet. That is, it is desirable that the transmission inhibition period be estimated using the latest packet received from each of the wireless stations.

Figure 8:
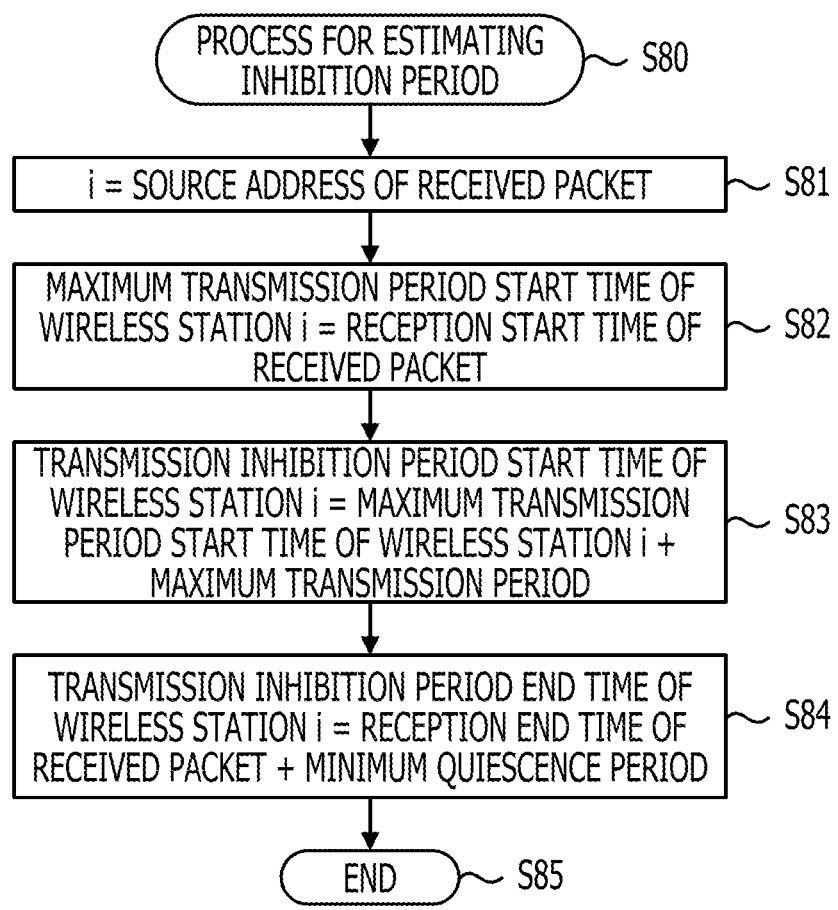
FIG. 8 is a flowchart of the process and operation performed by an inhibition period estimating unit of the wireless station according to the first exemplary embodiment of the present disclosure.

FIG. 8 is a flowchart of the process and operation performed by the inhibition period estimating unit of the wireless station according to the first exemplary embodiment.

Upon receiving the reception start time and the reception end time of the packet from the time measuring unit 561, the inhibition period estimating unit 562 estimates the transmission inhibition period of the wireless station that transmitted the packet (step S80).

The inhibition period estimating unit 562 reads a source address i of the received packet from the packet (step S81).

The inhibition period estimating unit 562 estimates that the maximum transmission period start time of a wireless station i is the same as the input reception start time (the maximum transmission period start time=the packet reception start time) (step S82).

The inhibition period estimating unit 562 reads the maximum transmission period of the wireless station i from the transmission time restriction storage sub-unit 571. Thereafter, the inhibition period estimating unit 562 sets the transmission inhibition period start time of the wireless station i to a point in time at which the read maximum transmission period has elapsed from the maximum transmission period start time of the wireless station i computed in step S82 (i.e., the transmission inhibition period start time=the maximum transmission period start time+the maximum transmission period) (step S83).

The inhibition period estimating unit 562 reads the minimum quiescence period of the wireless station i from the transmission time restriction storage sub-unit 571. Thereafter, the inhibition period estimating unit 562 sets the transmission inhibition period end time of the wireless station i to a point in time at which the read minimum quiescence period has elapsed since the packet reception end time input in step S80 (i.e., the transmission inhibition period end time=the packet reception end time+the minimum quiescence period) (step S84).

The inhibition period estimating unit 562 outputs, to the inhibition period storage sub-unit 572, the transmission inhibition period start time computed in step S83 and the transmission inhibition period end time computed in step S84 as the transmission inhibition period. Thereafter, the estimation process of the transmission inhibition period is completed (step S85).

Through such steps, according to the first exemplary embodiment, the wireless station 50 may identify the wireless station that transmitted the packet based on the received packet. In addition, the wireless station 50 may estimate the transmission inhibition period of the wireless station that transmitted the packet.

Note that in step S81, the source address is extracted from the packet before the transmission inhibition period is estimated. However, the source address of the packet may be extracted after the packet is received and the transmission inhibition period is computed.

According to the first exemplary embodiment, since the wireless station, the communication system, and the communication method may estimate the transmission inhibition period of the wireless station that is the source of the received packet by overhearing the packet, the wireless station, the communication system, and the communication method may be aware of the communication condition of another station.

According to the first exemplary embodiment, the wireless station, the communication system, and the communication method may vary the response time limit in accordance with the communication condition of another station. Thus, unnecessary retransmission may be avoided.

As a result, according to the first exemplary embodiment, the wireless station, the communication system, and the communication method may improve the data transfer efficiency of the retransmission process. In addition, power consumption may be reduced, and the wireless resource usage efficiency may be improved.

In the above description, the wireless station sets the response time limit by estimating the transmission inhibition period of the wireless station that transmitted the received packet based on the received packet.

Alternatively, the wireless station may identify the source of the received packet and set the response time limit in accordance with the identified transmitter wireless station. For example, in order to transmit a packet to the identified transmitter wireless station, the response time limit may be set in accordance with the maximum transmission inhibition period. In order to transmit a packet to one of the other wireless stations, the response time limit may be set in accordance with the roundtrip delay time. Even through such a method, the above-described advantage may be provided.

In the above description, unnecessary retransmission is avoided by adjusting the waiting time for an ACK responsive to the transmitted packet. However, the time at which a packet is transmitted may be adjusted first. Thereafter, the waiting time for an ACK responsive to a packet may be set so as to be a given value. Even through such a method, unnecessary retransmission may be avoided.

In addition, in the above description, the estimated transmission inhibition period is applied to the retransmission process. However, application of the estimated transmission inhibition period is not limited to the retransmission process. The estimated transmission inhibition period may be applied to a process other than the retransmission process.

Second Exemplary Embodiment

According to a second exemplary embodiment, upon receiving a packet and, thereafter receiving a new packet within a given period of time, a wireless station, a communication system, and a communication method set the response time limit (the retransmission start time) based on the new received packet.

That is, according to the second exemplary embodiment, upon receiving a plurality of packets from the same wireless station within the maximum transmission period, the wireless station, the communication system, and the communication method set the response time limit based on the latest received packet.

The wireless station, the communication system, and the communication method according to the second exemplary embodiment are described below with reference to FIGS. 9 and 10.

Since the schematic illustration of the ad hoc network (FIG. 1), the response time limit setting examples 1 and 2 (FIGS. 3 and 4), the hardware configuration diagram or the functional block diagram of a wireless station (FIG. 5), the flowchart of a packet reception process (FIG. 6), and the flowchart of the packet transmission process (FIG. 7) are similar to those of the first exemplary embodiment, descriptions of the drawings are not repeated.

Figure 9:
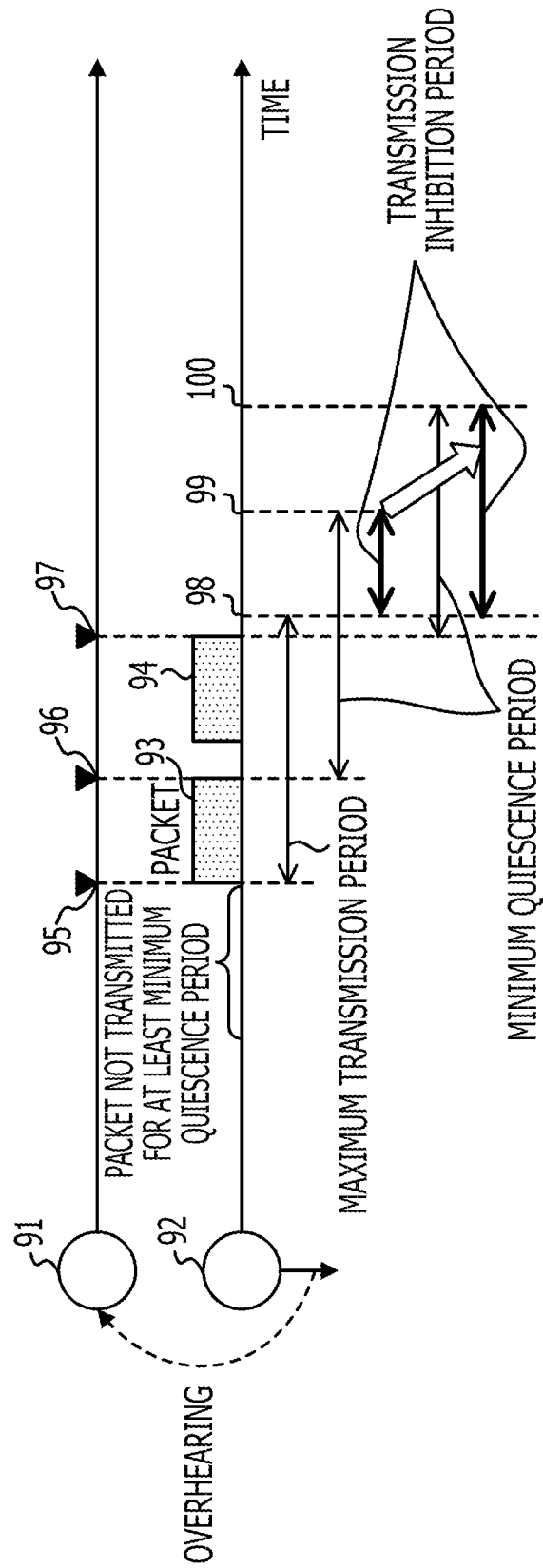
FIG. 9 is a schematic illustration of a second exemplary embodiment of the present disclosure.

FIG. 9 is a schematic illustration of the second exemplary embodiment of the present disclosure.

As illustrated in FIG. 9, a wireless station 92 transmits a plurality of packets during the maximum transmission period.

At that time, a first packet 93 of the packets transmitted from the wireless station 92 during the maximum transmission period is used for estimating the transmission inhibition period start time. The wireless station 92 stops transmitting a packet for the minimum quiescence period or longer. Thereafter, the wireless station 92 transmits the first packet 93.

The reason why a first packet transmitted by the wireless station 92 after the wireless station 92 stops transmitting a packet for the minimum quiescence period or longer is used for estimating the transmission inhibition period start time is described below.

Assume that the wireless station 92 transmits a packet A before transmitting the first packet 93. At that time, the wireless station 92 transmits the packet A and, subsequently, transmits the first packet 93 before the minimum quiescence period elapses.

Then, the maximum transmission period start time is the same as the transmission start time of the packet A. Accordingly, under such assumption, the transmission start time of the first packet 93 differs from the start time of the maximum transmission period.

In addition, if at least the minimum quiescence period has elapsed since the transmission end time of the packet A, the transmission inhibition period of the wireless station 92 has already ended.

That is, according to the second exemplary embodiment, a packet used for estimating the transmission inhibition period is a first packet received from the wireless station that has not transmitted any packet for the minimum quiescence period and longer.

Accordingly, if a wireless station 91 has not received a packet from the wireless station 92 for the minimum quiescence period or longer, the wireless station 91 uses a packet 93 received first after that time for estimating the transmission inhibition period. Thus, the wireless station 91 estimates that the transmission inhibition period start time of the wireless station 92 is the same as a time 98 at which the maximum transmission period has elapsed since a reception start time 95 of the first packet 93.

Furthermore, the wireless station 91 estimates that the transmission inhibition period end time is the same as a time 99 at which the minimum quiescence period has elapsed since a reception end time 96 of the packet 93.

However, if the wireless station 92 transmits a plurality of packets within the maximum transmission period, the wireless station 92 is forced to update the end time of the transmission inhibition period each time a packet is transmitted.

As illustrated in FIG. 9, the wireless station 92 retransmits the packet after the reception end time 96 and completes the transmission of the packet at a time 97. Therefore, the transmission inhibition period end time of the wireless station 92 is a time 100 at which the minimum quiescence period has elapsed from the time 97.

That is, by measuring the time 97 at which reception of the last packet during the maximum transmission period ends, the wireless station 91 may accurately estimate the end time of the transmission inhibition period of the wireless station 92.

Figure 10:
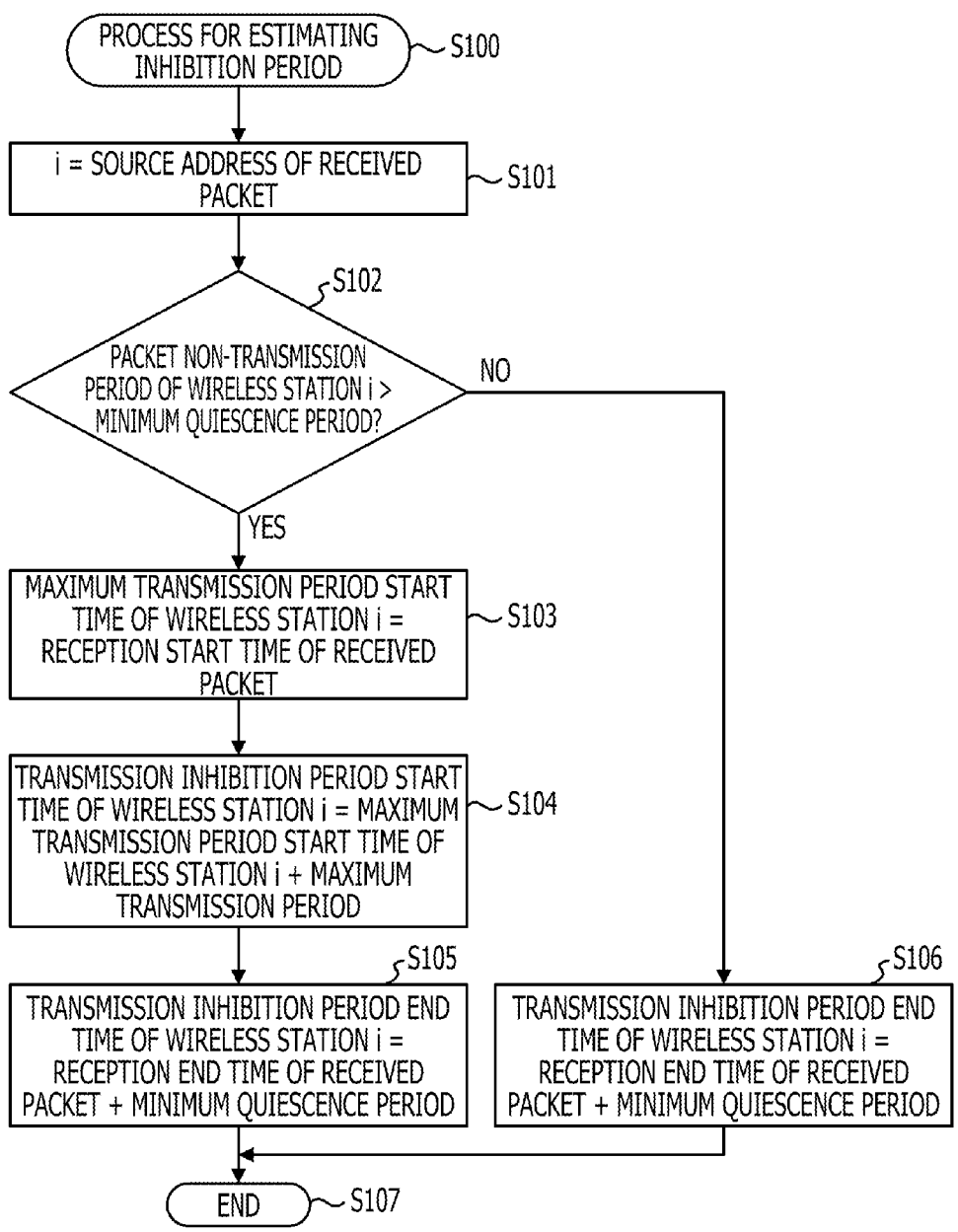
FIG. 10 is a flowchart of the process and the operation performed by an inhibition period estimating unit of the wireless station according to the second exemplary embodiment of the present disclosure.

FIG. 10 is a flowchart of the process and the operation performed by the inhibition period estimating unit of the wireless station according to the second exemplary embodiment.

Upon receiving the reception start time and the reception end time of the packet from the time measuring unit 561, the inhibition period estimating unit 562 estimates the transmission inhibition period of the wireless station that transmitted the packet (step S100).

The inhibition period estimating unit 562 reads the source address i from the received packet (step S101).

Thereafter, the inhibition period estimating unit 562 determines whether a packet non-transmission period of the wireless station i before the wireless station i receives the packet is longer than the minimum quiescence period. That is, the inhibition period estimating unit 562 determines whether the wireless station 50 does not receive any packet from the wireless station i for at least the minimum quiescence period before the wireless station 50 receives the target packet (step S102).

If, in step S102, the packet non-transmission period of the wireless station i is longer than the minimum quiescence period, the inhibition period estimating unit 562 sets the maximum transmission period start time of the wireless station i to the reception start time input from the time measuring unit 561 (step S103).

The inhibition period estimating unit 562 reads the maximum transmission period of the wireless station i from the transmission time restriction storage sub-unit 571. Thereafter, the inhibition period estimating unit 562 sets the transmission inhibition period start time of the wireless station i to the time at which the read maximum transmission period has elapsed from the maximum transmission period start time of the wireless station i computed in step S103 (step S104).

The inhibition period estimating unit 562 reads the minimum quiescence period of the wireless station i from the transmission time restriction storage sub-unit 571. Subsequently, the inhibition period estimating unit 562 sets the transmission inhibition period end time of the wireless station i to the time at which the read minimum quiescence period has elapsed from the reception end time input in step S100 (step S105).

However, if, in step S102, the packet non-transmission period of the wireless station i is shorter than the minimum quiescence period, the inhibition period estimating unit 562 reads the minimum quiescence period of the wireless station i from the transmission time restriction storage sub-unit 571. Thereafter, the inhibition period estimating unit 562 sets the transmission inhibition period end time of the wireless station i to the time at which the read minimum quiescence period has elapsed from the reception end time input in step S100 without estimating the transmission inhibition period start time (step S106).

Subsequently, the inhibition period estimating unit 562 outputs, to the inhibition period storage sub-unit 572, the transmission inhibition period start time computed in step S104 and the transmission inhibition period end time computed in step S105 as the transmission inhibition period. Thereafter, an estimation process of the transmission inhibition period is completed. However, if, in step S102, the packet non-transmission period is shorter than the minimum quiescence period, the inhibition period estimating unit 562 updates the transmission inhibition period end time of the wireless station i to the transmission inhibition period end time computed in step S106. Thereafter, an estimation process of the transmission inhibition period is completed (step S107).

By performing the above-described process flow each time the wireless station receives a packet, the transmission inhibition period may be estimated for a wireless station that transmits a plurality of packets during the maximum transmission period.

According to the second exemplary embodiment, since the wireless station may estimate the transmission inhibition period of a wireless station that transmits a plurality of packets during the maximum transmission period, the transmission inhibition period may be more accurately estimated. In addition, since the response time limit may be set in accordance with the estimated transmission inhibition period, the data transfer efficiency may be improved. Furthermore, the wireless resource usage efficiency may be improved, and power consumption may be reduced.

Third Exemplary Embodiment

According to the third exemplary embodiment, a wireless station, a communication system, and a communication method are applicable to the case in which the maximum transmission period is preset so as to be equal to the transmission period for one packet.

The wireless station, the communication system, and the communication method according to the third exemplary embodiment are described below with reference to FIGS. 11 and 12.

Since the schematic illustration of the ad hoc network (FIG. 1), the response time limit setting examples 1 and 2 (FIGS. 3 and 4), the hardware configuration diagram or the functional block diagram of a wireless station (FIG. 5), the flowchart of a packet reception process (FIG. 6), and the flowchart of the packet transmission process (FIG. 7) are similar to those of the first exemplary embodiment, descriptions of the drawings are not repeated.

Figure 11:
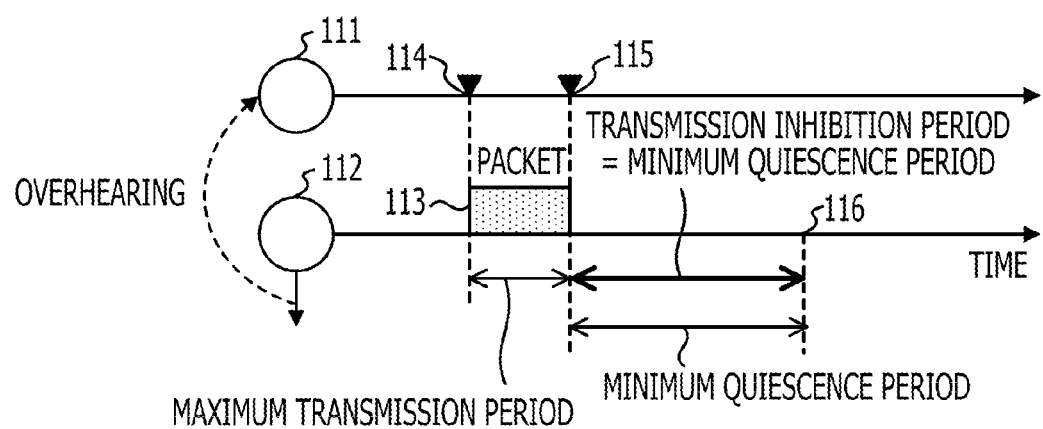
FIG. 11 is a schematic illustration of a third exemplary embodiment of the present disclosure.

FIG. 11 is a schematic illustration of the third exemplary embodiment of the present disclosure.

As illustrated in FIG. 11, according to the third exemplary embodiment, since the maximum transmission period is equal to the transmission period for one packet, a wireless station 112 is forced to temporarily halt packet transmission each time the wireless station 112 transmits a packet. Accordingly, the minimum quiescence period of packet transmission of the wireless station 112 is directly considered as the transmission inhibition period.

That is, a wireless station 111 estimates that the start time of the transmission inhibition period is the same as a packet reception end time 115. In addition, the wireless station 111 estimates that the end time of the transmission inhibition period is the same as a time 116 at which the minimum quiescence period has elapsed from the packet reception end time 115.

In addition, the start time and the end time of the transmission inhibition period is estimated for each of all of the transmitted packets. Accordingly, the start time of the transmission inhibition period is estimated each time for all of the packets.

Figure 12:
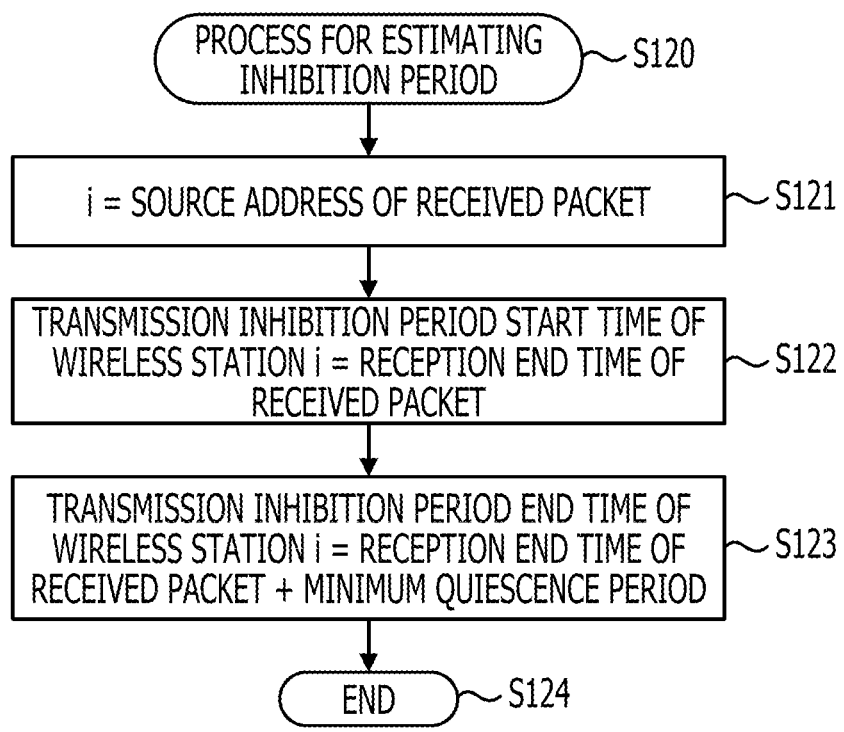
FIG. 12 is a flowchart of the process and the operation performed by an inhibition period estimating unit of a wireless station according to the third exemplary embodiment of the present disclosure.

FIG. 12 is a flowchart of the process and the operation performed by the inhibition period estimating unit of the wireless station according to the third exemplary embodiment.

Upon receiving the reception start time and the reception end time of the packet from the time measuring unit 561, the inhibition period estimating unit 562 estimates the transmission inhibition period of the wireless station that transmitted the packet (step S120).

The inhibition period estimating unit 562 reads the source address i from the received packet (step S121).

Thereafter, the inhibition period estimating unit 562 sets the transmission inhibition period start time of the wireless station i to the reception end time input in step S120 (step S122).

The inhibition period estimating unit 562 reads the minimum quiescence period of the wireless station i from the transmission time restriction storage sub-unit 571. Subsequently, the inhibition period estimating unit 562 sets the transmission inhibition period end time of the wireless station i to the time at which the read minimum quiescence period has elapsed from the reception end time input in step S120 (step S123).

The inhibition period estimating unit 562 outputs, to the inhibition period storage sub-unit 572, the transmission inhibition period start time computed in step S122 and the transmission inhibition period end time computed in step S123 as the transmission inhibition period as the transmission inhibition period and completes the estimation process of the transmission inhibition period (step S124).

By applying the above-described process flow to all of the packets, the inhibition period estimating unit 562 may estimate the transmission inhibition period of another station.

According to the third exemplary embodiment, the wireless station, the communication system, and the communication method may further easily estimate the transmission inhibition period if the maximum transmission period is preset so as to be equal to the transmission period for one packet. Accordingly, in addition to the advantages provided by the first and second exemplary embodiments, the wireless station may further reduce power consumption.

Fourth Exemplary Embodiment

According to a fourth exemplary embodiment, a wireless station, a communication system, and a communication method are applicable to the case in which the maximum transmission period is preset so as to be equal to the transmission period for one packet, and the minimum quiescence period is preset so as to be equal to the transmission time for the transmitted packet.

The wireless station, the communication system, and the communication method according to the fourth exemplary embodiment are described below with reference to FIGS. 13 and 14.

Since the schematic illustration of the ad hoc network (FIG. 1), the response time limit setting examples 1 and 2 (FIGS. 3 and 4), the hardware configuration diagram or the functional block diagram of a wireless station (FIG. 5), the flowchart of a packet reception process (FIG. 6), and the flowchart of the packet transmission process (FIG. 7) are similar to those of the first exemplary embodiment, descriptions of the drawings are not repeated.

Figure 13:
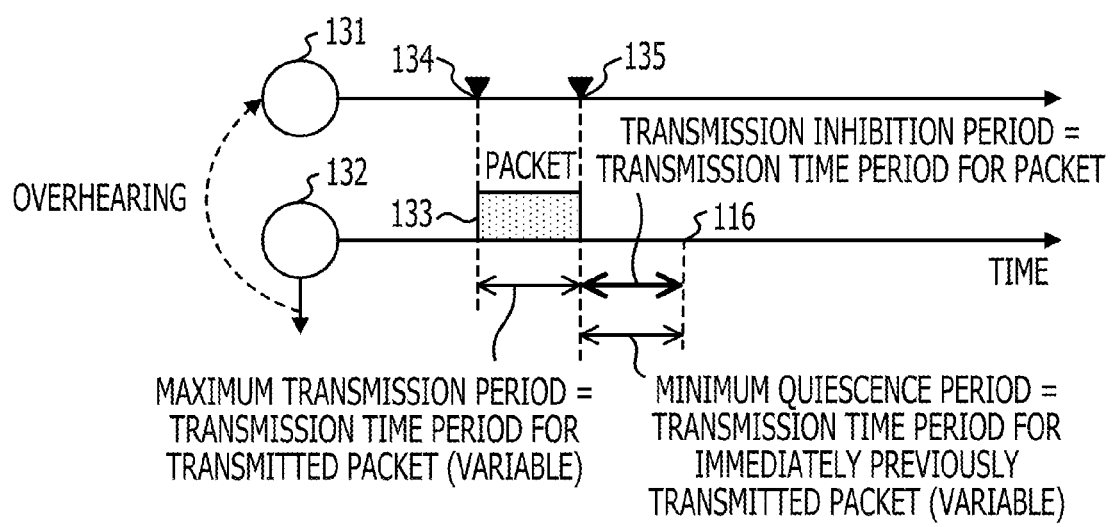
FIG. 13 is a schematic illustration of the fourth exemplary embodiment of the present disclosure.

FIG. 13 is a schematic illustration of the fourth exemplary embodiment of the present disclosure.

As illustrated in FIG. 13, according to the fourth exemplary embodiment, like the third exemplary embodiment, a wireless station 132 is forced to temporarily halt packet transmission each time the wireless station 132 transmits a packet. Accordingly, the minimum quiescence period is directly considered as the transmission inhibition period. Thus, the start time of the transmission inhibition period is the same as a packet reception end time 135.

According to the fourth exemplary embodiment, since the minimum quiescence period is the same as a transmission time period 133 of the packet that is immediately previously transmitted by the wireless station 132, the end time of the transmission inhibition period of the wireless station 132 is the time at which the transmission time period 133 for the transmitted packet has elapsed from the packet reception end time 135.

That is, the transmission time period 133 for the transmitted packet is obtained by subtracting a packet reception start time 134 from the packet reception end time 135. A transmission inhibition period end time 136 may be estimated as follows:

the transmission inhibition period end time 136=the packet reception end time 135+(the packet reception end time 135−the packet reception start time 134)=2×the packet reception end time 135−the packet reception start time 134.

In addition, according to the fourth exemplary embodiment, like the third exemplary embodiment, the transmission inhibition period is estimated for each of all of the transmitted packets. Accordingly, the start time of the transmission inhibition period is estimated each time for all of the packets.

Figure 14:
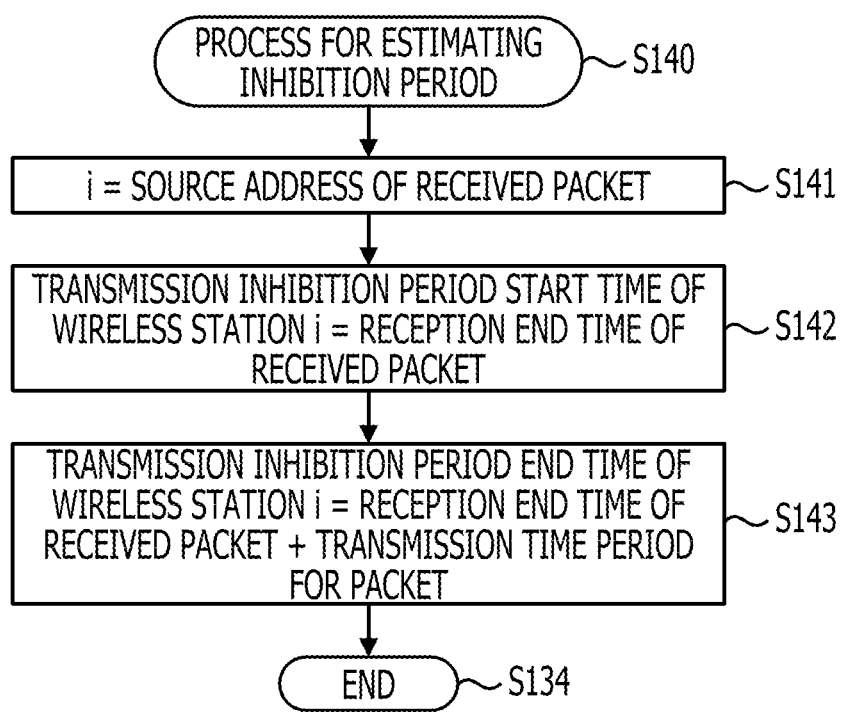
FIG. 14 is a flowchart of the process and the operation performed by an inhibition period estimating unit of a wireless station according to a fourth exemplary embodiment of the present disclosure.

FIG. 14 is a flowchart of the process and the operation performed by the inhibition period estimating unit of the wireless station according to the fourth exemplary embodiment.

Upon receiving the reception start time and the reception end time of the packet from the time measuring unit 561, the inhibition period estimating unit 562 estimates the transmission inhibition period of the wireless station that transmitted the packet (step S140).

The inhibition period estimating unit 562 reads the source address i from the received packet (step S141).

Thereafter, the inhibition period estimating unit 562 sets the transmission inhibition period start time of the wireless station i to the reception end time input in step S140 (step S142).

Subsequently, the inhibition period estimating unit 562 sets the transmission inhibition period end time of the wireless station i to the time at which the transmission time period for the packet has elapsed from the reception end time input in step S140 (step S143).

The inhibition period estimating unit 562 outputs, to the inhibition period storage sub-unit 572, the transmission inhibition period start time computed in step S142 and the transmission inhibition period end time computed in step S143 as the transmission inhibition period and completes the estimation process of the transmission inhibition period (step S144).

In addition, as illustrated in FIG. 13, in step S143, the transmission inhibition period end time may be obtained as follows:

the transmission inhibition period end time=2×the packet reception end time−the packet reception start time.

By applying the above-described process flow to all of the packets, the inhibition period estimating unit 562 may estimate the transmission inhibition period of another station.

According to the fourth exemplary embodiment, the wireless station, the communication system, and the communication method may further easily estimate the transmission inhibition period if the maximum transmission period is preset so as to be equal to the packet transmission time period for one packet and the minimum quiescence period is variable in accordance with a packet. Accordingly, the wireless station may further reduce power consumption.

Fifth Exemplary Embodiment

According to a fifth exemplary embodiment, the wireless station, the communication system, and the communication method estimates the transmission inhibition period only when the sequence number assigned to the received packet and the sequence number assigned to a packet immediately previously received are consecutive.

The wireless station, the communication system, and the communication method according to the fifth exemplary embodiment are described below with reference to FIGS. 15 and 16.

Since the schematic illustration of the ad hoc network (FIG. 1), the response time limit setting examples 1 and 2 (FIGS. 3 and 4), the hardware configuration diagram or the functional block diagram of a wireless station (FIG. 5), the flowchart of a packet reception process (FIG. 6), and the flowchart of the packet transmission process (FIG. 7) are similar to those of the first exemplary embodiment, descriptions of the drawings are not repeated.

Figure 15:
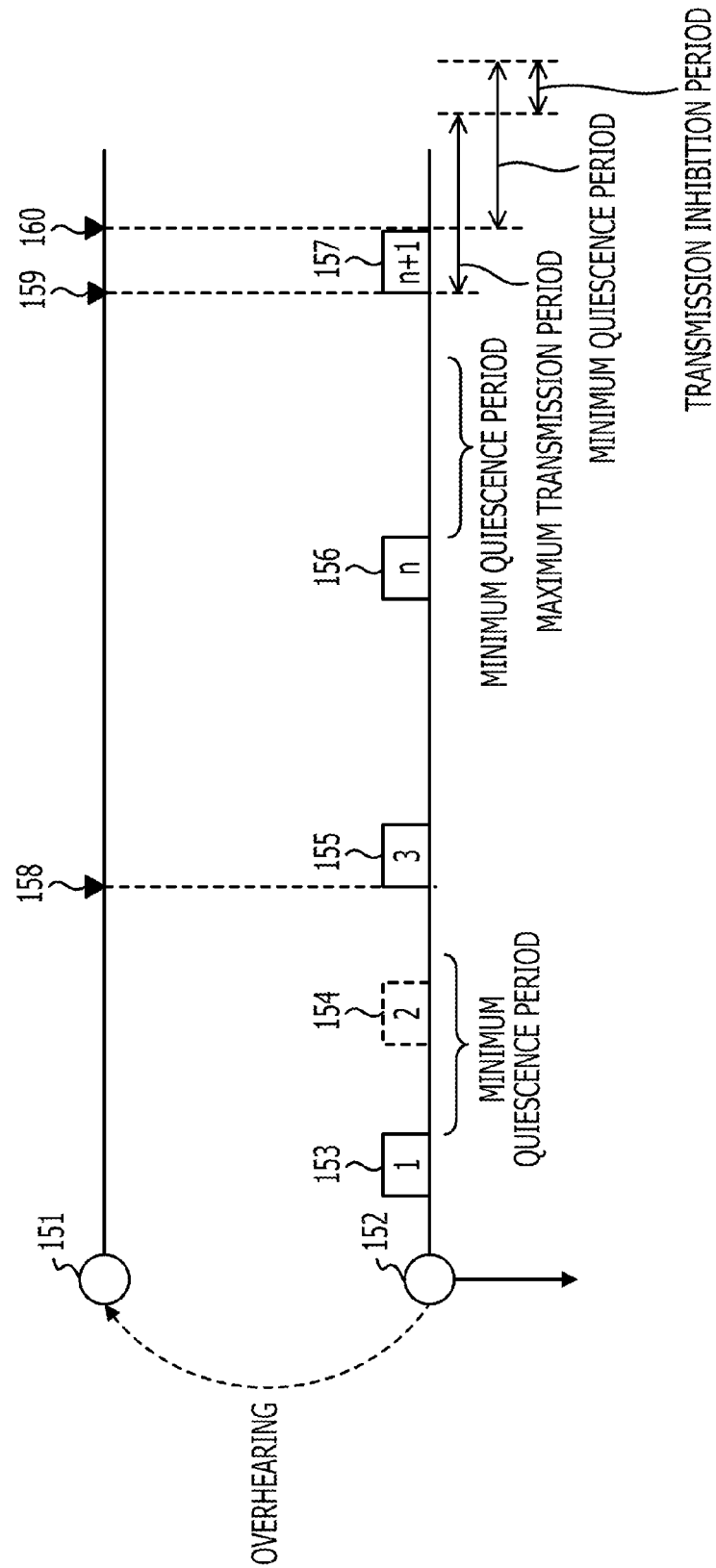
FIG. 15 is a schematic illustration of a fifth exemplary embodiment of the present disclosure.

FIG. 15 is a schematic illustration of the fifth exemplary embodiment of the present disclosure.

As illustrated in FIG. 15, as an example, if the sequence numbers assigned to the packets received from a wireless station 152 are consecutive, a wireless station 151 estimate the start time and the end time of the transmission inhibition period.

For example, assume that the wireless station 151 is unable to overhear a packet 154 for some reason. That is, according to the fifth exemplary embodiment, the wireless station 151 determines that a packet received before a packet 155 is received is a packet 153. Accordingly, the wireless station 151 determines that the minimum quiescence period has already elapsed since the wireless station 152 transmitted the packet 153.

As described above, if the wireless station 151 is unable to overhear all of the packets transmitted from the wireless station 152, the wireless station 151 erroneously estimates the transmission inhibition period.

Therefore, according to the fifth exemplary embodiment, only when the sequence numbers of the packets are consecutive, the transmission inhibition period is estimated.

The sequence number 3 assigned to the packet 155 that is overheard and the sequence number 1 assigned to the packet 153 are not consecutive. Accordingly, the wireless station 151 determines that the packet 154 having the sequence number 2 assigned thereto is not received (overheard). Thus, the wireless station 151 does not estimate the transmission inhibition period of the packet 155.

The wireless station 151 estimates the transmission inhibition period only when like a packet 157, the wireless station 151 does not receive a packet for at least the minimum quiescence period before the wireless station 151 receives the packet 157 and if the sequence number of the packet 157 and the sequence number of a packet 156 received before the wireless station 151 receives the packet 157 are consecutive.

That is, in the example illustrated in FIG. 15, since the sequence numbers assigned to the packet 156 and the packet 157 are consecutive, the wireless station 151 sets the transmission inhibition period start time of the wireless station 152 to the time at which the maximum transmission period has elapsed from a reception start time 159 of the packet 157. In addition, the wireless station 151 sets the transmission inhibition period end time of the wireless station 152 to the time at which the minimum quiescence period has elapsed from a reception end time 160 of the packet 157.

Figure 16:
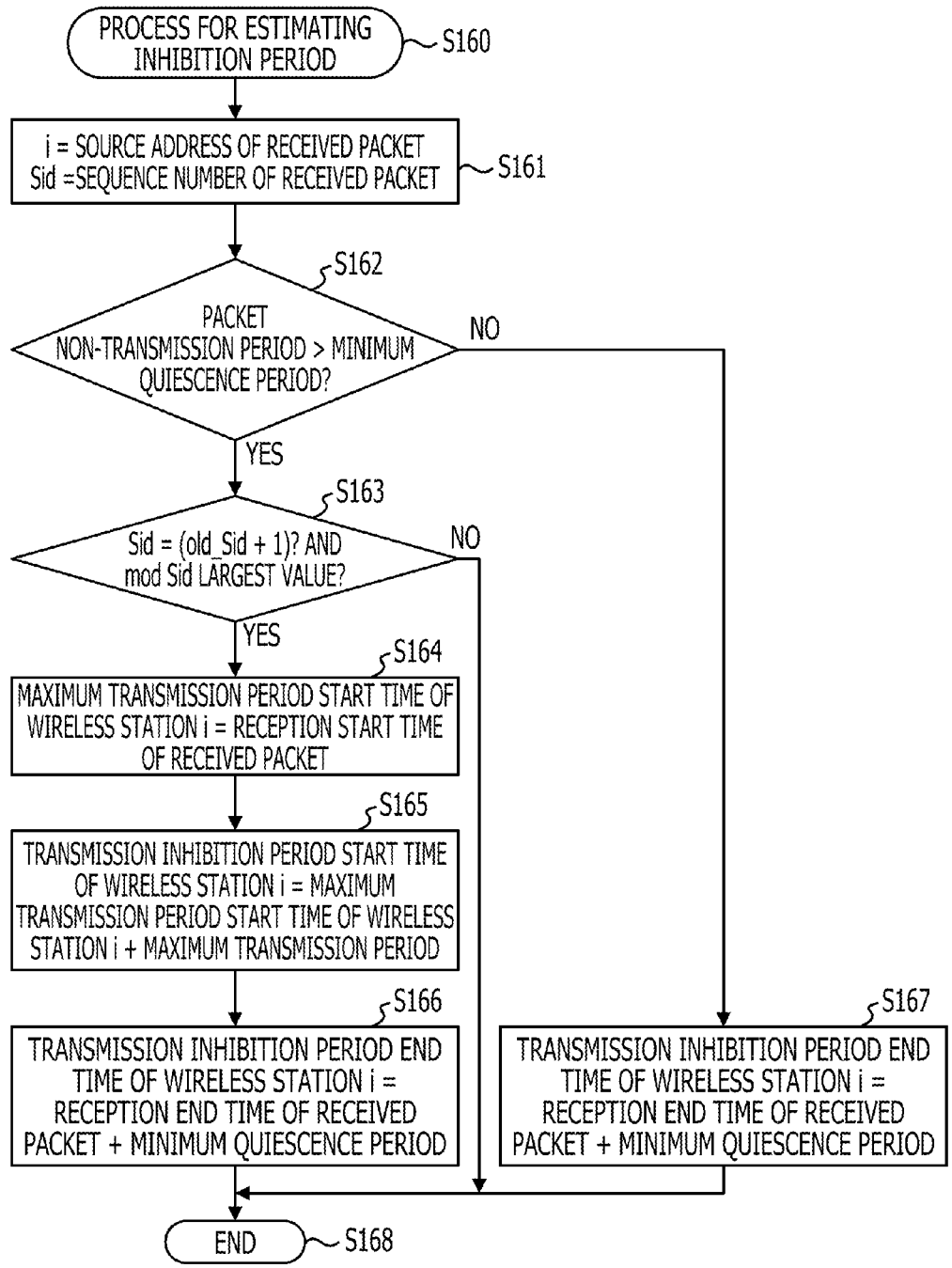
FIG. 16 is a flowchart of the process and the operation performed by an inhibition period estimating unit of a wireless station according to the fifth exemplary embodiment of the present disclosure.

FIG. 16 is a flowchart of the process and the operation performed by the inhibition period estimating unit of the wireless station according to the fifth exemplary embodiment.

Upon receiving the reception start time and the reception end time of the packet from the time measuring unit 561, the inhibition period estimating unit 562 estimates the transmission inhibition period of the wireless station that transmitted the packet (step S160).

The inhibition period estimating unit 562 reads the source address i from the received packet. In addition, the inhibition period estimating unit 562 reads a sequence number Sid from the received packet (step S161).

Thereafter, the inhibition period estimating unit 562 reads the maximum transmission period of the wireless station i from the transmission time restriction storage sub-unit 571. Subsequently, the inhibition period estimating unit 562 determines whether the packet non-transmission period of the wireless station i is longer than the read minimum quiescence period. That is, the inhibition period estimating unit 562 determines whether the wireless station i does not receive a packet for at least the minimum quiescence period before the received packet is transmitted (step S162).

If, in step S162, the packet non-transmission period of the wireless station i is longer than the read minimum quiescence period, the inhibition period estimating unit 562 determines whether the sequence number Sid of the received packet is one greater than the sequence number of the packet immediately previously received. In addition, the inhibition period estimating unit 562 determines whether the sequence number Sid of the received packet is the largest among the sequence numbers of the packet previously received from the wireless station i (step S163).

If, in step S163, it is determined that the sequence number of the received packet is one greater than the sequence number of the packet immediately previously received and is the largest number among the sequence numbers of the packets previously received from the wireless station i, the inhibition period estimating unit 562 sets the maximum transmission period start time of the wireless station i to the reception start time input in step S160 (step S164).

Thereafter, the inhibition period estimating unit 562 reads the maximum transmission period of the wireless station i from the transmission time restriction storage sub-unit 571. The inhibition period estimating unit 562 sets the transmission inhibition period start time of the wireless station i to the time at which the read maximum transmission period has elapsed from the maximum transmission period start time of the wireless station i computed in step S164 (step S165).

Subsequently, the inhibition period estimating unit 562 reads the minimum quiescence period of the wireless station i from the transmission time restriction storage sub-unit 571. The inhibition period estimating unit 562 sets the transmission inhibition period end time of the wireless station i to the time at which the read minimum quiescence period has elapsed from the reception end time input in step S160 (step S166).

However, if, in step S162, the packet non-transmission period of the wireless station i is shorter than the read minimum quiescence period, the inhibition period estimating unit 562 reads the minimum quiescence period of the wireless station i from the transmission time restriction storage sub-unit 571. Thereafter, the inhibition period estimating unit 562 sets the transmission inhibition period end time of the wireless station i to the time at which the read minimum quiescence period has elapsed from the reception end time of the packet input in step S160 (step S167).

The inhibition period estimating unit 562 outputs, to the inhibition period storage sub-unit 572, the transmission inhibition period start time computed in step S165 and the transmission inhibition period end time computed in steps S166 and S167 as the transmission inhibition period and completes the estimation process of the transmission inhibition period (step S168).

However, if, in step S163, it is determined that the sequence number of the received packet is not one greater than the sequence number of the packet immediately previously received or is not the largest number among the sequence numbers of the packets previously received from the wireless station i, the inhibition period estimating unit 562 completes the estimation process of the transmission inhibition period without estimating the transmission inhibition period of the wireless station i for the packet (step S168).

Through the above-described steps, according to the fifth exemplary embodiment, the wireless station estimates the transmission inhibition period only when the sequence numbers of the received packets are consecutive. Accordingly, the transmission inhibition period may be more accurately estimated.

According to the wireless station, the communication system, and the communication method of the fifth exemplary embodiment, even when, for example, one of two wireless stations is unable to overhear a first packet that is transmitted by the other wireless station after the minimum quiescence period has elapsed, the one of the wireless stations does not erroneously estimate the transmission inhibition period of the other station.

Accordingly, unnecessary retransmission process may be further avoided and, therefore, the data transfer efficiency may be further improved.

Sixth Exemplary Embodiment

According to a sixth exemplary embodiment, a wireless station, a communication system, and a communication method differ from those of the first exemplary embodiment in that the set response time limit is stored instead of the estimated transmission inhibition period.

The wireless station, the communication system, and the communication method according to the sixth exemplary embodiment are described below with reference to FIG. 17.

Since the schematic illustration of the ad hoc network (FIG. 1), the schematic illustration (any one of FIGS. 2, 9, 13 and 15), the response time limit setting examples 1 and 2 (FIGS. 3 and 4), and the flowchart of the process performed by the inhibition period estimating unit (any one of FIGS. 8, 10, 12, 14, and 16) are similar to those of the first to fifth exemplary embodiments, descriptions of the drawings are not repeated.

Figure 17:
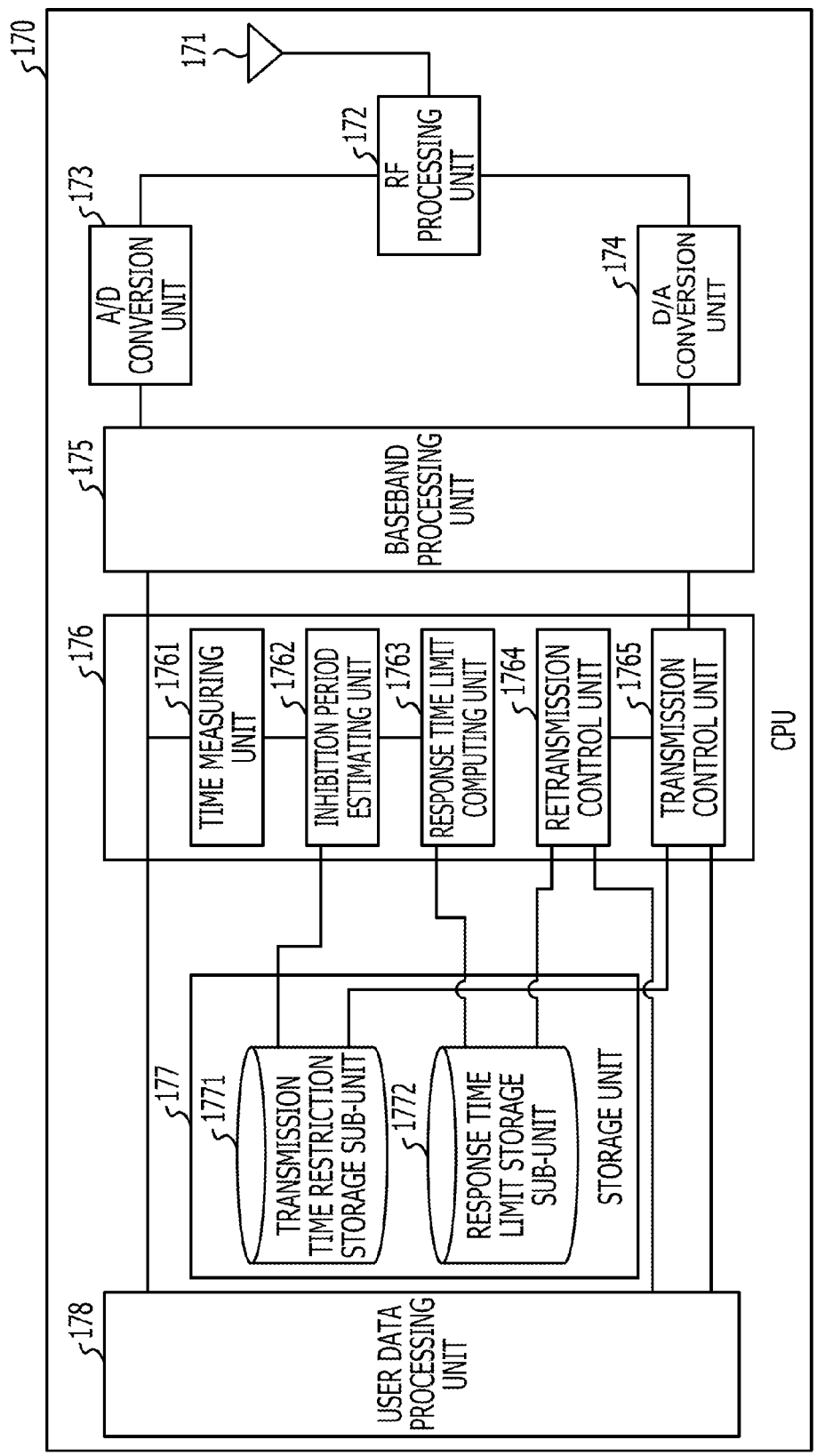
FIG. 17 is a hardware configuration diagram or a functional block diagram of a wireless station according to a sixth exemplary embodiment of the present disclosure.

FIG. 17 is a hardware configuration diagram or a functional block diagram of a wireless station 170 according to the sixth exemplary embodiment.

As illustrated in FIG. 17, the wireless station 170 includes an antenna 171, an RF processing unit 172, an A/D conversion unit 173, a D/A conversion unit 174, a baseband processing unit 175, a CPU 176, a storage unit 177, and a user data processing unit 178.

Since the antenna 171, the RF processing unit 172, the A/D conversion unit 173, the D/A conversion unit 174, the baseband processing unit 175, and the user data processing unit 178 of FIG. 17 are similar to those of FIG. 5 according to the first exemplary embodiment, descriptions of the units are not repeated.

According to the sixth exemplary embodiment, the CPU 176 performs control so that the function of each of a time measuring unit 1761, an inhibition period estimating unit 1762, a response time limit computing unit 1763, a retransmission control unit 1764, and a transmission control unit 1765 (described in more detail below) is executed.

The processes performed by the response time limit computing unit 1763 and the retransmission control unit 1764 under the control of the CPU 176 according to the sixth exemplary embodiment differ from those performed by the response time limit computing unit 563 and the retransmission control unit 564 according to the first exemplary embodiment.

Upon receiving a packet from the baseband processing unit 175, the time measuring unit 1761 measures the reception start time and the reception end time of the input packet and outputs the result of the measurement to the inhibition period estimating unit 1762.

The inhibition period estimating unit 1762 reads the transmission time restriction from the storage unit 177 (described in more detail below). Thereafter, the inhibition period estimating unit 1762 estimates the transmission inhibition period of the wireless station that transmitted the received packet from the read transmission time restriction, the reception start time and the reception end time input from the time measuring unit 1761, and a terminal ID assigned to the packet. Subsequently, the inhibition period estimating unit 1762 outputs the result of the estimation and the ID of the source wireless station to the response time limit computing unit 1763.

Upon receiving the result of estimation of the transmission inhibition period from the inhibition period estimating unit 1762, the response time limit computing unit 1763 computes the response time limit using the result of estimation of the transmission inhibition period. Thereafter, the response time limit computing unit 1763 outputs, to the storage unit 177, the response time limit in association with the ID of the source wireless station.

Upon receiving a transmission request from the user data processing unit 178, the retransmission control unit 1764 reads the response time limit of the corresponding wireless station from the storage unit 177 and sets the read response time limit.

In addition, if an ACK is not returned before the set response time limit, the retransmission control unit 1764 outputs the data to be retransmitted to the transmission control unit 1765 in order to retransmit the packet.

When the wireless station 170 transmits a packet, the transmission control unit 1765 of the wireless station 170 reads the transmission time restriction from the storage unit 177 and performs control so that the data input from the user data processing unit 178 is transmitted under the read transmission time restriction.

In addition, upon receiving the packet to be retransmitted from the retransmission control unit 1764, the transmission control unit 1765 performs control so that the received data is retransmitted.

According to the sixth exemplary embodiment, the storage unit 177 includes a transmission time restriction storage sub-unit 1771 and a response time limit storage sub-unit 1772.

The sixth exemplary embodiment differs from the first exemplary embodiment in that the storage unit 177 includes the response time limit storage sub-unit 1772 instead of the inhibition period storage sub-unit 572.

The response time limit storage sub-unit 1772 stores the terminal ID and the response time limit information input from the CPU 176. In addition, in response to an instruction control signal input from the CPU 176, the response time limit storage sub-unit 1772 outputs, to the CPU 176, the terminal ID of the corresponding wireless station and the associated response time limit information among the stored response time limit information items.

By storing the response time limit corresponding to the estimated transmission inhibition period, the wireless station 170 may set the response time limit immediately after receiving the transmission request of a packet. Accordingly, the communication efficiency may be improved.

According to the sixth exemplary embodiment, by storing the response time limit based on a received packet, the wireless station, the communication system, and the communication method may immediately set the response time limit when transmitting a packet. Thus, the communication efficiency may be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless station comprising:
   a receiver configured to receive a packet transmitted from another wireless station;
   a processor configured to calculate a retransmission start time of a packet transmitted to another wireless station, which is after a transmission inhibition period of the another wireless station calculated based on values acquired within the wireless station; and
   a transmitter configured to control transmission of a packet that is the same as the packet transmitted to the another wireless station in accordance with whether a response signal responsive to the packet transmitted to the another wireless station is received before the set retransmission start time is reached,
   wherein the values are a reception start time of the received packet, a reception end time of the received packet, a minimum quiescence period from the reception end time of the received packet, and a maximum transmission period which is a time period during which a subsequent packet is capable of being transmitted without waiting for the minimum quiescence period,
   wherein the processor is configured to calculate the retransmission start time based on a transmission inhibition period from a start time obtained by adding the reception start time and the maximum transmission period to an end time obtained by adding the reception end time and the minimum quiescence period.

2. The wireless station according to claim 1, wherein the processor identifies the another wireless station that transmitted the received packet based on the received packet and sets the retransmission start time in accordance with the identified wireless station.

3. The wireless station according to claim 1, wherein the processor measures a reception end time of the received packet and sets the retransmission start time in accordance with the measured reception end time.

4. The wireless station according to claim 1, wherein the processor computes a communication condition of the another wireless station based on the received packet and sets the retransmission start time in accordance with the computed communication condition.

5. The wireless station according to claim 1, wherein upon receipt of a new packet from the another wireless station that transmitted the received packet within a given period of time after the packet was received, the processor sets the retransmission start time based on the new received packet.

6. The wireless station according to claim 1, wherein the processor computes a period of time during which the another wireless station is allowed to transmit a packet and sets the retransmission start time of the transmitted packet in accordance with the computed period of time.

7. The wireless station according to claim 1, wherein the minimum quiescence period and the maximum transmission period are prescribed in a system including the wireless station, and the transmission inhibition period is a period from an end of the maximum transmission period to an end of the minimum quiescence period.

8. A communication system comprising:
   a first wireless station among wireless stations communicating with each other including a transmitter configured to transmit a first packet; and
   a second wireless station among the wireless stations including a receiver configured to receive the first packet,
   a processor configured to calculate a retransmission start time of a second packet transmitted to the first wireless station, which is after a transmission inhibition period of the first wireless station calculated based on values acquired within the second wireless station, and
   a transmitter configured to control transmission of a packet that is the same as the second packet in accordance with whether a response signal responsive to the second packet is received before the set retransmission start time; wherein each of the wireless stations other than the second wireless station includes a transmitter configured to return a response signal responsive to a second packet in accordance with a reception condition of the second packet,
   wherein the values are a reception start time of the received packet, a reception end time of the received packet, a minimum quiescence period from the reception end time of the received packet, and a maximum transmission period which is a time period during which a subsequent packet is capable of being transmitted without waiting for the minimum quiescence period,
   wherein the processor is configured to calculate the retransmission start time based on a transmission inhibition period from a start time obtained by adding the reception start time and the maximum transmission period to an end time obtained by adding the reception end time and the minimum quiescence period.

9. The communication system according to claim 8, wherein the minimum quiescence period and the maximum transmission period are prescribed in a system including the first wireless station and the second wireless station, and the transmission inhibition period is a period from an end of the maximum transmission period to an end of the minimum quiescence period.

10. A communication method comprising:
    receiving a packet at a wireless station among wireless stations communicating with each other from another wireless station;
    calculating a retransmission start time of a packet transmitted to the another wireless station among the wireless stations, which is after a transmission inhibition period of the another wireless station calculated based on values acquired within the wireless station; and
    controlling transmission of a packet that is the same as the packet transmitted to the another wireless station in accordance with whether a response signal responsive to the packet transmitted to the another wireless station is received before the set retransmission start time is reached,
    wherein the values are a reception start time of the received packet, a reception end time of the received packet, a minimum quiescence period from the reception end time of the received packet, and a maximum transmission period which is a time period during which a subsequent packet is capable of being transmitted without waiting for the minimum quiescence period,
    wherein the processor is configured to calculate the retransmission start time based on a transmission inhibition period from a start time obtained by adding the reception start time and the maximum transmission period to an end time obtained by adding the reception end time and the minimum quiescence period.

11. The communication method according to claim 10, wherein the setting identifies the another wireless station that transmitted the received packet based on the received packet and sets the retransmission start time in accordance with the identified wireless station.

12. The wireless station according to claim 10, wherein the setting measures a reception end time of the received packet and sets the retransmission start time in accordance with the measured reception end time.

13. The wireless station according to claim 9, wherein the setting computes a communication condition of the another wireless station based on the received packet and sets the retransmission start time in accordance with the computed communication condition.

14. The wireless station according to claim 10, wherein upon receipt of a new packet from the another wireless station that transmitted the received packet within a given period of time after the packet was received, the setting sets the retransmission start time based on the new received packet.

15. The wireless station according to claim 10, wherein the setting computes a period of time during which the another wireless station is allowed to transmit a packet and sets the retransmission start time of the transmitted packet in accordance with the computed period of time.

16. The communication method according to claim 10, wherein the minimum quiescence period and the maximum transmission period are prescribed in a system including the wireless station, and the transmission inhibition period is a period from an end of the maximum transmission period to an end of the minimum quiescence period.

\* \* \* \* \*